United States Patent [19]
Colby et al.

[11] Patent Number: 5,929,400
[45] Date of Patent: Jul. 27, 1999

[54] SELF COMMISSIONING CONTROLLER FOR FIELD-ORIENTED ELEVATOR MOTOR/DRIVE SYSTEM

[75] Inventors: Roy Stephen Colby, Raleigh, N.C.; Alberto Vecchiotti, Middletown, Conn.; Neil A. Greiner, New Britian, Conn.; Leslie M. Lamontagne, Prospect, Conn.; Ronnie E. Thebeau, Middletown, Conn.

[73] Assignee: Otis Elevator Company, Farmington, Conn.

[21] Appl. No.: 08/996,264

[22] Filed: Dec. 22, 1997

[51] Int. Cl.$^6$ .............................. G05B 11/36; B66B 1/34
[52] U.S. Cl. ..................... 187/393; 187/290; 318/610
[58] Field of Search ........................... 187/393; 364/148, 364/150, 162, 167

[56] References Cited

U.S. PATENT DOCUMENTS

| | | | |
|---|---|---|---|
| 5,223,778 | 6/1993 | Svarovsky et al. | 318/610 |
| 5,476,158 | 12/1995 | Mann et al. | 187/289 |
| 5,492,158 | 2/1996 | Schmidt et al. | 318/561 |
| 5,510,689 | 4/1996 | Lipo et al. | 318/809 |
| 5,773,938 | 6/1998 | Seong et al. | 318/6 |
| 5,796,236 | 8/1998 | Royak | 318/804 |

OTHER PUBLICATIONS

M. Depenbrock and N.R. Klaes, *Determination of the Induction Machine Parameters and their Dependencies on Saturation*, Ruhr–University Bochum, Germany, pp. 17–22.

N.R. Klaes, *Parameter Identification of an Induction Machine with Regard to Dependencies on Saturation*, IEEE Transactions on Industry Application, vol. 29, No. 6, Nov. 1993.

A. M. Khambadkone and J. Holtz, *Vector–Controlled Induction Motor Drive with a Self–Commissioning Scheme*, IEEE Transactions on Industrial Electronics, vol. 38, No. 5, Oct. 1991.

J. Holtz and T. Thimm, Identification of the Machine Parameters in a Vector–Controlled Induction Motor Drive, IEEE Transactions on Industry Applications, vol. 27, No. 6 Nov./Dec. 1991.

T. Rowan, R. Kerkman and D. Leggate, A Simple On–Line Adaption for Indirect Field Orientation of an Induction Machine, IEEE Transactions on Industry Applications, vol. 27, No. 4 Jul./Aug. 1991.

R. Kerkman, J. Thunes, T. Rowan and D. Schlegel, A Frequency–Based Determination of Transient Inductance and Rotor Resistance for Field Commissioning Purpose, IEEE Transactions on Indusry Applications, vol. 32, No. 3, May/Jun. 1996.

H. Schierling, Self–Commissioning—A Novel Feature of Modern Inverter–Fed Induction Motor Drives, pp. 287–290.

M. Summer and G. Asher, Autocommissioning for voltage–referenced voltage–fed vector–controlled induction motor drives, IEEE Proceedings, vol. 140, No. 3, May 1993.

Kudor et al, Self–Commissioning for Vector Controller Inductor Motors, IEEE 1993, pp. 528–535.

(List continued on next page.)

*Primary Examiner*—Robert E. Nappi

[57] ABSTRACT

A self-commissioning controller 7 for a field-oriented elevator motor controller 14 includes calculating an integral gain $K_I$, a proportional gain Kp, and an overall gain (Gc) for the motor controller; obtaining initial values of a rotor time constant $\tau_R$, magnetizing current Id, and motor torque constant $K_T$ for the motor controller 14, and obtaining a value of a motor transient inductance Lσ; calculating final values for said rotor time constant $\tau_R$ and magnetizing current Id, using said transient inductance Lσ; and calculating a system inertia J* parameter for speed loop compensation 16 within the motor controller 14. The controller 7 may also include calculating the initial values for $\tau_R$, Id, and $K_T$*, and performing self-commissioning automatically upon receiving a command from a service tool 80.

3 Claims, 22 Drawing Sheets

OTHER PUBLICATIONS

Tungpimolrut et al, A Direct Measuring Method of Machine Parameters for Vector–Controlled Induction Motor Drives, 1993 IEEE pp. 997–1002.

Green et al, Measurement and On–line Estimation Approaches to a Parameter Variation in Vector Controllers, IEEE Colloq. 1993. pp. 3/1–3/5.

Wade et al, Parameter Identification for Vector Controlled Induction Machines, Heriot–Wat University, UK, pp. 1187–1192.

Bunte et al, Parameter Identification of an Inverter–fed Induction Motor at Standstill with Correlation Method, Universal Paderborn–Germany, The European Power Electronics Association 1993, pp. 97–102.

Wang et al, An Automated rotor time Constant Measurement System for Indirect Field–Oriented Drives, IEEE Transaction on Industry Applications, vol. 24, No. 1, Jan./Feb. 1988.

Lorenz, Tuning of Field–Oriented Induction Motor Controllers for High–Performance Applications, IEEE Transactions on Industry Applications, vol. 1A–22, No. 2., Mar./Apr. 1986.

D. W. Novotny and T.A. Lipo, Vector Control and Dynamics of AC Drives, Oxform Science Publications, pp. 205–251.

DeDoncker et al, The Universal Field Oriented Controller, University of Wisconsin.

Lorenz et al, A control systems Perspective of field oriented Control for AC Servo Drives, University of Wisconsin.

Novotny and Lipo, WEMPEC, Wisconsin Electric Machines and Power Electronics Consortium, Tutorial Report, Chapter 4–1 –4–73.-

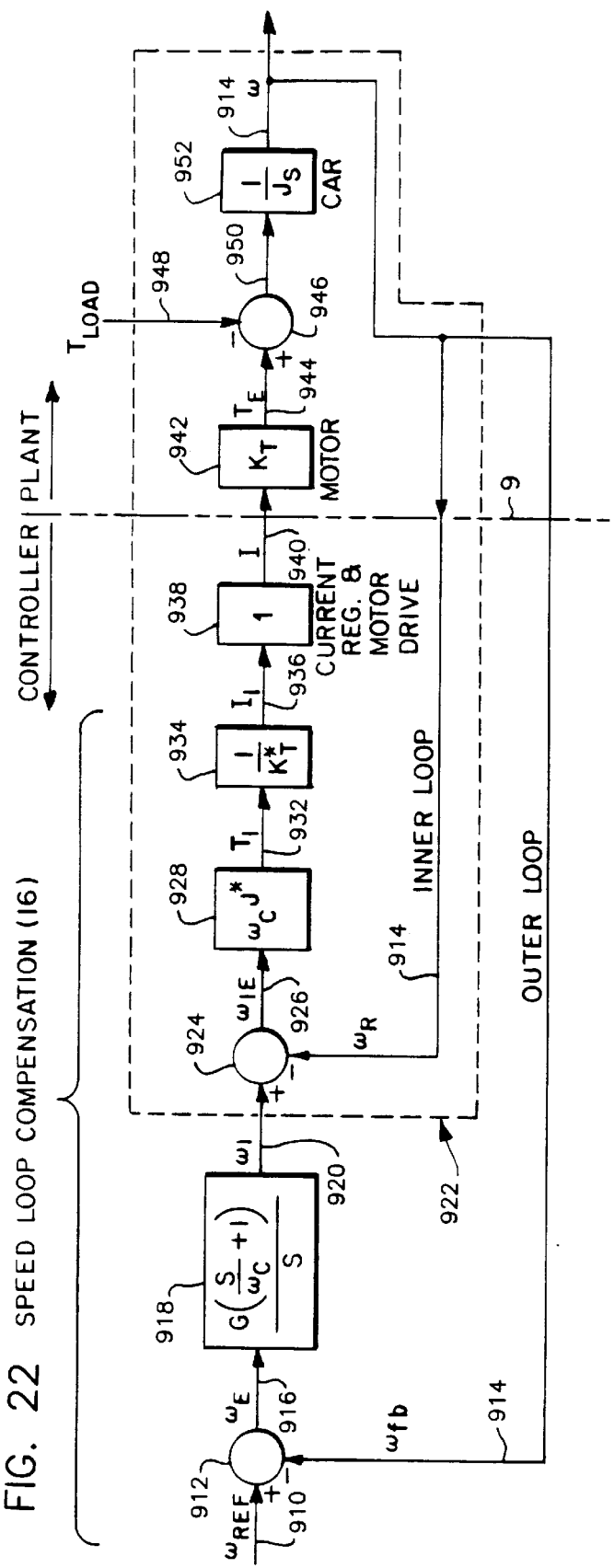
FIG. 22 SPEED LOOP COMPENSATION (16)
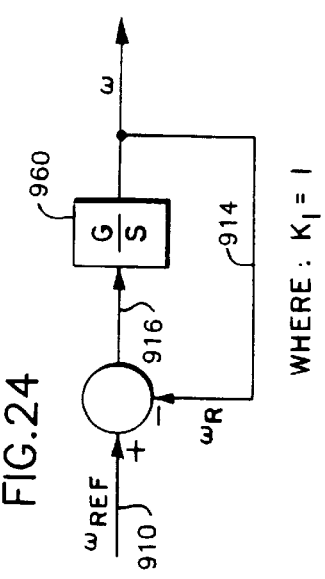
FIG. 24
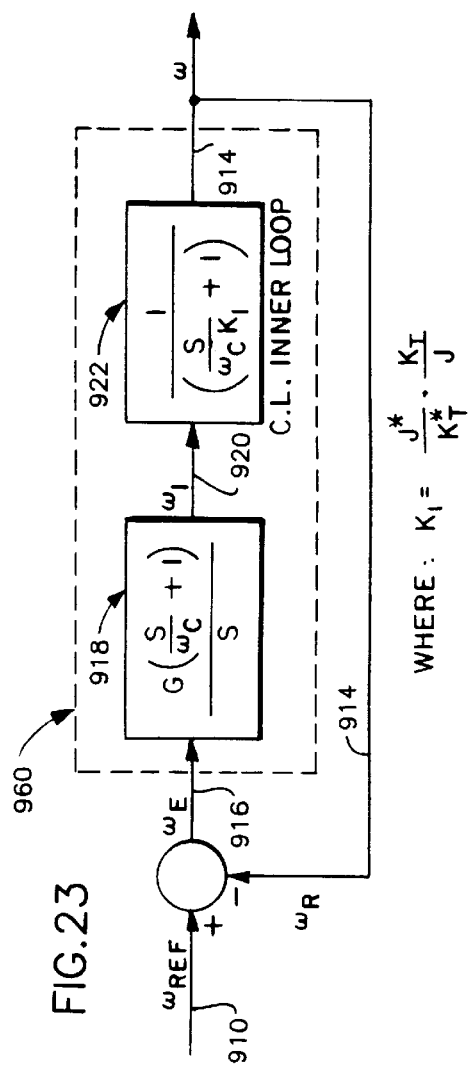
FIG. 23

5,929,400

SELF COMMISSIONING CONTROLLER FOR FIELD-ORIENTED ELEVATOR MOTOR/DRIVE SYSTEM

CROSS REFERENCES TO RELATED APPLICATIONS

U.S. application Ser. Nos. 08/996,234, 08/996,265, 08/996,263, and 08/996,262 filed contemporaneously herewith, contain subject matter related to that disclosed herein.

TECHNICAL FIELD

This invention relates to self-commissioning an elevator and, more particularly, to self-commissioning a field-oriented motor/drive system for an elevator.

BACKGROUND OF THE INVENTION

It is known in the art of elevator systems to use an AC induction motor with a variable frequency drive to provide traction power to an elevator system. However, proper function of the drive/motor combination requires that the motor parameters be identified and that the motor/drive control parameters be set to values which provide the desired system response. In addition, the inertia of the moving components must be accurately determined for proper control of the motor and elevator.

Typically, the motor parameters and the inertia of the moving components are determined through various techniques. One technique includes removing the motor from the job site to an engineering center for evaluation of motor parameters. Another technique requires sending an engineer to the job site with expensive test equipment to help match the motor and the drive. Determination of the inertia parameter may be determined by a complex calculation of system weights from contract data which may or may not be accurate at a given job site. Also, in many instances, all the system masses are not accurately known, and thus accurate calculation of system weights is not feasible. The above techniques are inefficient and costly, and in some cases, inaccurate. As a result, modernization or retrofit applications where new drives replace old drives in existing elevator systems become unattractive for building owners.

DISCLOSURE OF THE INVENTION

Objects of the invention include provision of a self-commissioning elevator controller that automatically calibrates itself on-site for a given elevator/motor drive system.

According to the present invention, a method of self-commissioning a field-oriented elevator motor controller includes: a) calculating an integral gain $K_I$, a proportional gain Kp, and an overall gain (Gc) for the motor controller; b) obtaining initial values of a rotor time constant $\tau_R$, magnetizing current Id, and motor torque constant $K_T^*$ for the motor controller, and obtaining a value of a motor transient inductance Lσ; c) calculating final values for said rotor time constant $\tau_R$ and magnetizing current Id, using said transient inductance Lσ; and d) calculating a system inertia J* parameter for the motor controller.

According further to the present invention, the step of obtaining includes calculating the initial values for $\tau_R$, Id, and $K_T^*$. According still further to the present invention, performing steps (a)–(d) automatically upon receiving a command from a service tool.

The invention represents a significant improvement over the prior art by providing a motor controller which is automatically self-commissioning. The invention determines the necessary motor, control, and inertia parameters at the job site without the need to unrope the elevator for separate motor tests or to employ expensive and/or complicated test equipment or specially trained personnel. Accordingly, the invention reduces the time and cost of adjusting the elevator system to a new motor controller, thereby making it more attractive to retrofit or modernize old controllers in the field. The present invention automatically determines the necessary parameters and communicates to service personnel when self-commissioning has been completed or when a fault has occurred.

The foregoing and other objects, features and advantages of the present invention will become more apparent in light of the following detailed description of the exemplary embodiments thereof, as illustrated in the accompanying drawings.

BRIEF DESCRIPTION OF THE DRAWINGS

FIG. 22 is a control system block diagram model of a portion of the controller of FIG. 1, in accordance with the present invention.

FIG. 23 is a simplified control system block diagram of the system of FIG. 22, in accordance with the present invention.

FIG. 24 is a simplified control system block diagram of the system of FIG. 23, in accordance with the present invention.

BEST MODE FOR CARRYING OUT THE INVENTION

Figure 1:
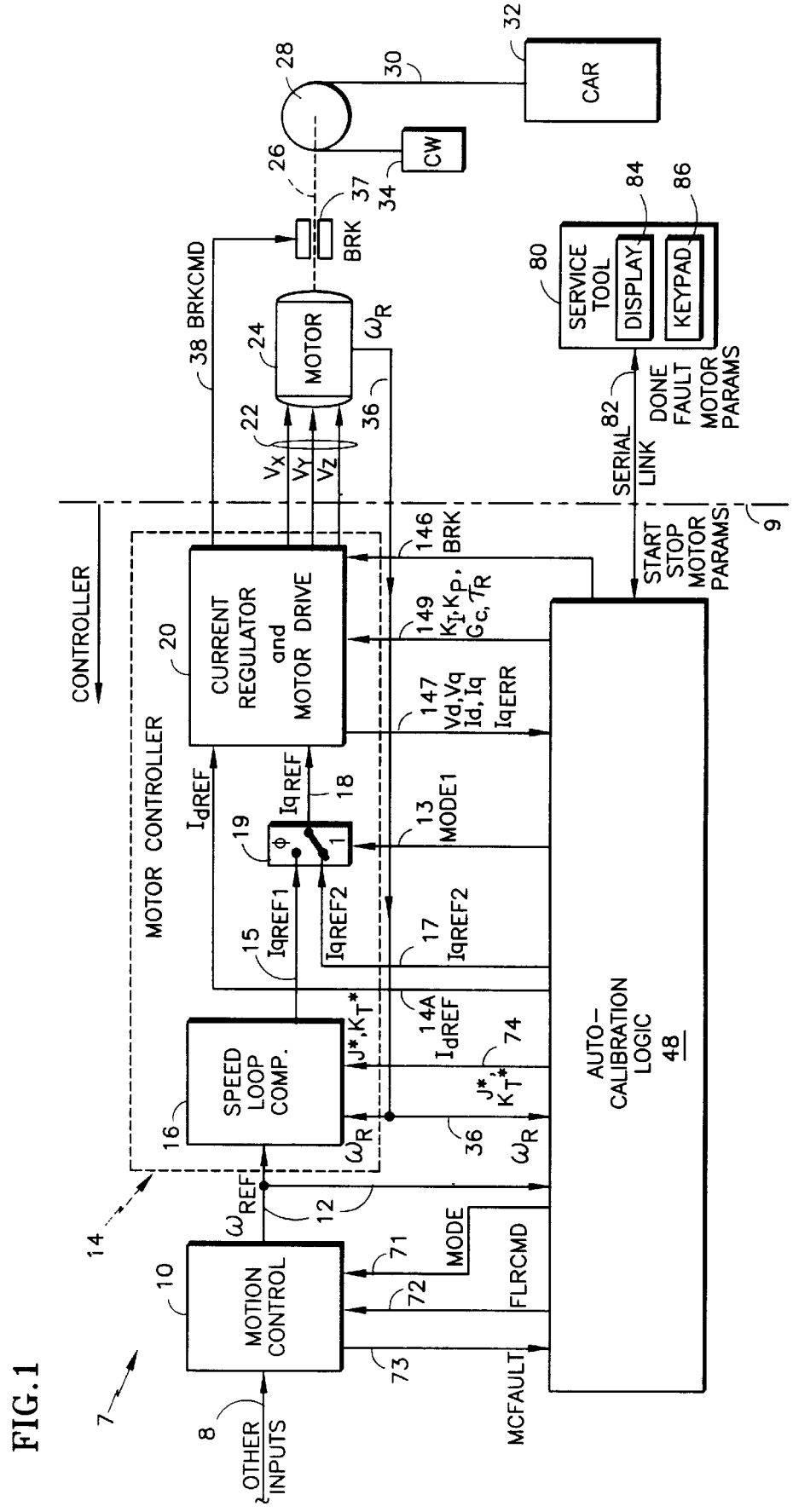
FIG. 1 is a schematic block diagram of an elevator controller including auto-calibration logic, in accordance with the present invention.

Referring to FIG. 1, that shown to the left of the line 9 is a portion of an elevator controller 7, which includes a motion controller or motion control sub-system (MCSS) 10 which receives floor destination commands from operational control logic (not shown) on a line 8 and provides a speed (or velocity) reference signal $\omega_{REF}$ on a line 12 (in the form of a speed profile) to a motor controller or drive/brake sub-system (DBSS) 14. The motor controller 14 comprises speed loop compensation logic 16 which closes a motor speed control loop, such as that described in Copending U.S. patent application, Ser. No. 08/996,262, filed contemporaneously herewith, and provides a torque current reference signal $I_{qREF1}$ on a line 15.

The motor control 14 also includes a known field-oriented (or vector-based) motor drive control that has two control loops each corresponding to a different control axis, a d-axis relating to motor magnetization, and a q-axis relating to torque. The d-axis loop has a d-axis current reference input signal $I_{dREF}$ provided on a line 14a which sets the d-axis current Id. $I_{dREF}$ (and thus Id) is set to a predetermined constant value so as to provide appropriate magnetic flux in the motor based on motor magnetization curves. The $I_{dREF}$ signal is fed to a field-oriented current regulator/motor drive circuit 20, described more hereinafter with FIG. 2.

The q-axis current loop has a first q-axis current reference input signal $I_{qREF1}$ on the line 15 that is fed to one input of a switch 19, provided by the speed loop compensation logic 16. The logic 16 provides the q-axis current reference signal $I_{qREF1}$ to the circuit 20 when it is not in auto-calibration (or self-commissioning) mode. The other input to the switch 19 is a second q-axis current reference input signal $I_{qREF2}$ on a line 17. The output of the switch 19 is the q-axis current loop reference signal $I_{qREF}$ on a line 18, which is set equal to $I_{qREF1}$ or $I_{qREF2}$ based on the state of a MODE1 signal provided to the switch 19 on the line 13. The $I_{qREF}$ signal is fed to the field-oriented current regulator/motor drive circuit 20, described more hereinafter with FIG. 2.

The circuit 20 provides 3-phase drive voltages $V_X$, $V_Y$, $V_Z$ on lines 22 to a motor 24, e.g., a three phase induction motor. The motor 24 provides a speed feedback signal $\omega_R$ indicative of the rotational speed of the motor 24 on a line 36 back to the controller 7.

Two examples of three phase AC induction motors which may be used with the present invention are, Model LUGA-225LB-04A, by Loher, having a rated power of 45 KW, rated voltage of 355 volts, rated speed of 1480, and rated frequency of 50 Hz, in a geared configuration; and Model 156MST, by Tatung (of Taiwan), having a rated power of 40 KW, rated voltage of 500 volts, rated speed of 251, and rated frequency of 16.7 Hz, in a gearless configuration. Other motors having other rated parameters may be used if desired.

The motor 24 is connected by a mechanical linkage 26, e.g., a shaft and/or a gearbox, to a sheave 28. A rope or cable 30 is wrapped around the sheave 28 and has one end connected to an elevator car 32 and the other end connected to a counterweight 34. The weight of the counterweight is typically equal to the empty car weight plus 40–50% of the rated load for the car.

Other elevator system configurations, and with or without a counterweight, with or without a gearbox, may be used if desired to convert the output torque of the motor 24 to movement of the elevator cab 32, such as dual lift (where two elevator cars are connected to a single rope, the cars move in opposite directions and each car provides a counterweight for the other car), drum machine (where the rope is wrapped around a drum driven by a motor), etc.

A brake 37, e.g., an electromagnetic actuated disk brake, is disposed on the shaft 26, and is driven by an electrical brake command signal BRKCMD on a line 38 from the circuit 20. The brake 37, when activated or "dropped", clamps onto the shaft 26 and prevents the motor shaft 26 from turning, i.e., locks the rotor, and thus prevents the sheave 28 from moving.

Figure 2:
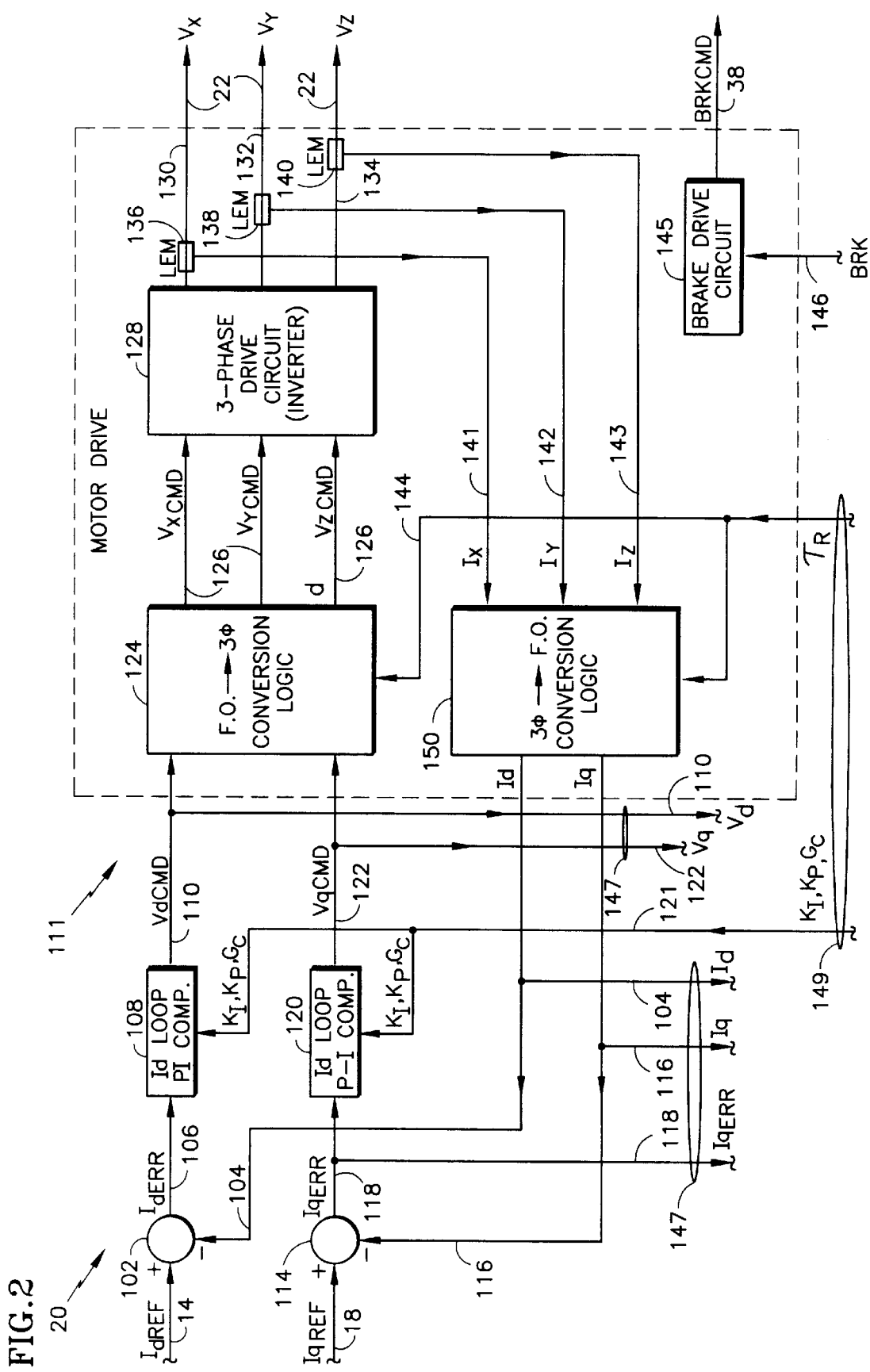
FIG. 2 is a block diagram of a field-oriented current regulator/motor drive circuit within the controller of FIG. 1, in accordance with the present invention.

Referring to FIG. 2, as discussed hereinbefore, it is known in the art of field-oriented motor control that such control uses current and voltage parameters corresponding to the d and q axes. In particular, the field-oriented current regulator/motor drive 20 of FIG. 1 comprises two current control loops, one for the d-axis (magnetizing) current Id and one for q-axis (torque) current Iq. The Id loop receives the $I_{dREF}$ signal on the line 14 to a positive input to a summer 102. A measured or feedback d-axis current signal Id on a line 104 is fed to a negative input to the summer 102. The output of the summer 102 is an error signal $I_{dERR}$ on a line 106 which is fed to control compensation logic 108, such as proportional-plus-integral (P-I) current loop control, having a proportional-gain $K_P$, an integral gain $K_I$, and an overall gain Gc, provided on lines 121, as described more hereinafter. The logic 108 20 provides a d-axis voltage command signal $V_{dCMD}$ on a line 110.

For the q-axis, the Iq loop receives the $I_{qREF}$ signal on the line 18 to a positive input to a summer 114. A measured or feedback q-axis current signal Iq on a line 116 is fed to a negative input to the summer 114. The output of the summer 114 is an error signal $I_{qERR}$ on a line 118 which is fed to control compensation logic 120, e.g., proportional-plus-integral (P-I) logic similar to the logic 108, having the proportional gain $K_P$ and the integral gain $K_I$, the same as the gains for logic 108. The output of the logic 120 is a q-axis voltage command signal $V_{qCMD}$ on a line 122. Because the q and d axis current loops are integral loops, in steady state, Id will be equal to $I_{dREF}$.

The voltage commands $V_{dCMD}$ and $V_{qCMD}$ are fed to known field-oriented to three-phase conversion logic 124 which converts the d-axis and q-axis voltage commands to three phase voltage commands $V_{XCMD}$, $V_{YCMD}$, $V_{ZCMD}$ on lines 126. The phase voltage commands $V_{XCMD}$, $V_{YCMD}$, $V_{ZCMD}$ are fed to a known three phase drive circuit (or inverter) 128 which provides three phase voltages $V_X$, $V_Y$, $V_Z$ on lines 130, 132, 134, respectively (collectively, the lines 22), to drive the motor 24 (FIG. 1).

Within the drive circuit 128 (details not shown), each of the voltage commands $V_{XCMD}$, $V_{YCMD}$, $V_{ZCMD}$ on lines 126 are converted to percent duty cycle commands indicative of the corresponding input voltage level. The percent duty cycle is converted into a pulse-width-modulated drive signal which drives power transistors to provide the pulse-width-modulated, variable frequency, three phase voltages $V_X$, $V_Y$, $V_Z$ on lines 130, 132, 134, respectively. The conversions within the drive 128 are performed using electronic components and/or software well known in the art of motor drive circuits. Any other type of drive circuit that receives input voltage commands and provides output phase voltages may be used, and the phase voltages need not be pulse-width modulated.

Phase currents $I_X$, $I_Y$, $I_Z$ associated with the voltages $V_X$, $V_Y$, $V_Z$, respectively, are measured by known current sensors 136, 138, 140, e.g., closed-loop Hall-effect current sensors (such as LEMS), respectively, and are provided on lines 141, 142, 143, respectively. The phase currents $I_X$, $I_Y$, $I_Z$ are fed to known three phase to field-oriented conversion logic 150, which provides a known conversion from phase currents to d-axis and q-axis currents Id, Iq, on the lines 104,116 which are fed to the summers 102,114, respectively, as feedback currents.

It is known in the art of field oriented drives that the value of the rotor time constant $\tau_R$, the torque constant $K_T$, the rated motor magnetizing current $I_{dRATED}$ and rated motor torque current $I_{qRATED}$ must be known. These motor parameters are provided to the logics 124,150 on line 144. In particular, $\tau_R$ is used to establish the correct slip frequency $\omega_S$ to achieve field orientation, and these parameters are also needed to achieve the desired or rated torque of the motor at the rated speed and the rated voltage of the motor. The lines 116, 118, 104, 122, 110, are collectively referred to as 147 and the lines 121,144 are collectively referred to as 149.

The converters 124,150 provide known conversions between vector (d and q axis) parameters and per-phase parameters, such as that described in D. Novotny, et al, "Vector Control and Dynamics of AC Drives", Oxford University Press, 1996, Ch 5, pp 203–251. The converters 124,150 may likely implement such conversions in software using a microprocessor or the like.

The motor drive logic 111 also includes a brake drive circuit 145 which receives an input signal BRK on a line 146 and provides a BRKCMD signal on the line 38.

Referring to FIG. 1, the present invention comprises self-commissioning, auto-calibration logic 48 which automatically computes and provides the P-I control parameters $K_I$, $K_P$, Gc and the motor parameter $\tau_R$ on the lines 149, and computes and provides the parameters J*, $K_T$* on lines 74, and the parameter $I_{dREF}$ on the line 14, to the motor controller 14. The logic also provides a secondary torque current reference signal $I_{qREF2}$ on the line 17. The logic 48 receives the parameters Vd, Vq, Id, Iq, and $I_{qERR}$ from the circuit 20 on the lines 147.

The logic 48 also provides the MODE 1 signal on the line 13 to the switch 19. The MODE1 flag causes the current reference signal $I_{qREF2}$ from the calibration logic 48 to be fed to the logic 20. The logic 48 also provides a break request signal BRK on the line 146 to the circuit 20. Further, the logic 66 also provides MODE and FLRCMD signals on lines 71,72, respectively, to the motion control logic 10. The MODE flag causes the motion logic 10 to accept floor commands from the FLRCMD signal on the line 72.

The FLRCMD signal commands the motion controller 10 to perform an elevator run in a commanded direction for a commanded number of floors (or to a particular destination floor) using a standard predetermined speed profile for $\omega_{REF}$ (e.g., FIG. 18) in the motor control 10, discussed hereinafter. The motion control logic 10 also provides a motor controller fault signal MCFAULT on a line 73 to the logic 48 to indicate if a fault has occurred during an elevator run. During the elevator run, the elevator is run through a normal speed profile using an empty car with the normal safety features enabled.

The logic 48 also communicates with a service tool 80 over a serial link 82. The service tool 80 includes a display 84 and a keypad (or keyboard) 86 for entering data into the service tool 80 and over the link 82 to the controller 7. In particular, the logic 48 receives a start command over the link 82 from the service tool 80, which controls when auto-calibration is started. The logic 48 also provides a DONE signal, a FAULT signal, and may also provide certain motor parameters, to the service tool 80 over the link 82. The DONE signal indicates when logic 48 has completed without faults and the FAULT signal indicates when a fault has been detected during self-commissioning.

The elevator motion commands (destination floors) may be entered manually using the service tool 80, or, alternatively, the elevator may be set up to cycle between two predetermined floors using the service tool 80. Also, to simplify implementation and maximize safety, all motion of the elevator may be under control of the normal elevator control systems and all normal hoistway safety functions may be in effect.

The logic 48 comprises known electronic components, which may include a microprocessor, interface circuitry, memory, software, and/or firmware, capable of performing the functions described herein.

Figure 3:
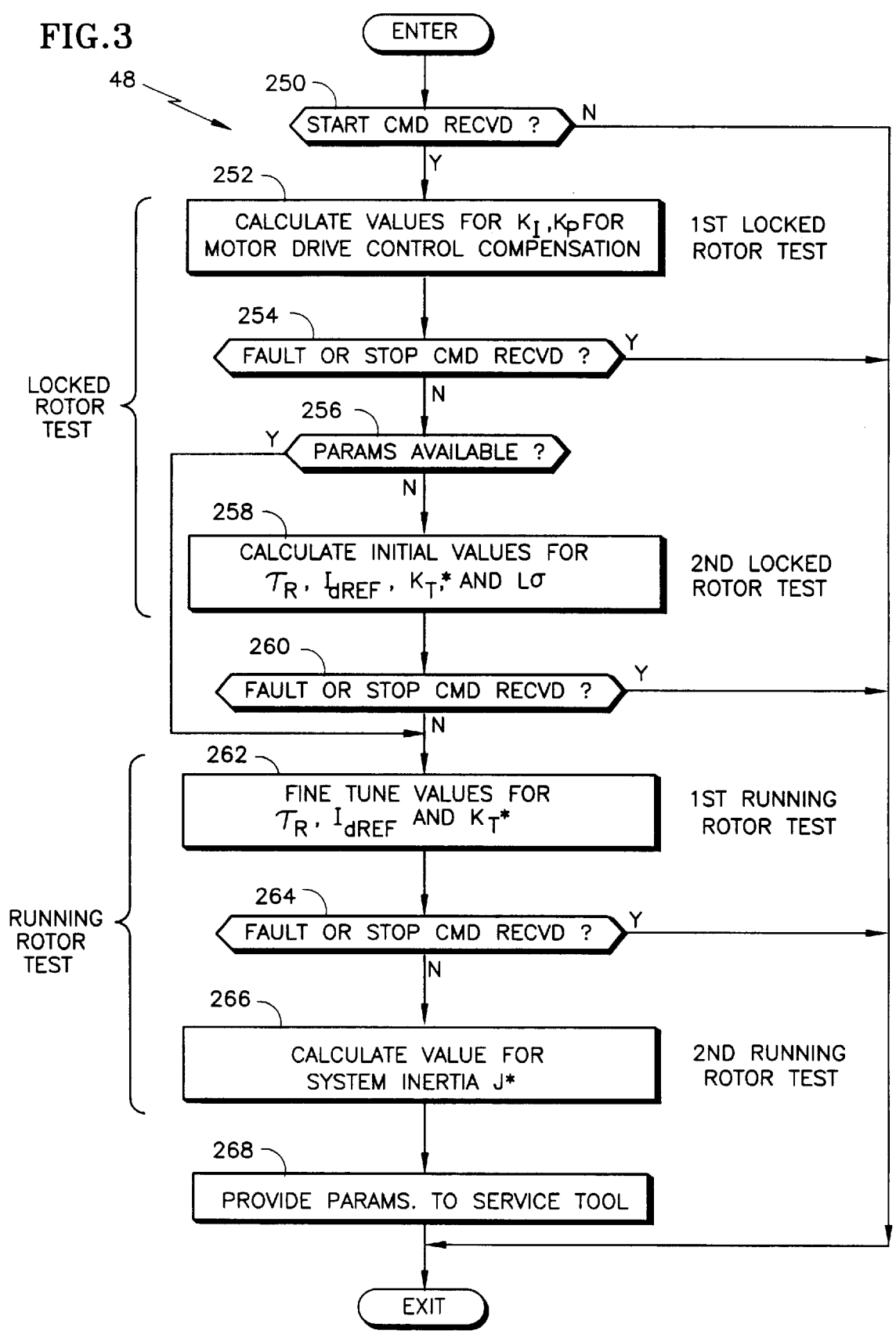
FIG. 3 is a top level logic flow diagram of the auto-calibration logic of FIG. 1 in accordance with the present invention.

Referring to FIG. 3, the logic 48 comprises four tests, 252,258,262,266. The first two tests 252, 258 are locked rotor tests which are performed with the motor at standstill (i.e., with the brake dropped). The other two tests 256,258 are running rotor tests, where the elevator is run up and/or down to determine various motor parameters.

In particular, the auto-calibration logic 48 enters at a step 250 which checks whether a start command has been received from the service tool 80. If a start command has not been received, the logic exits. If a start command has been received, a step 252 performs the first locked rotor test which calculates values for $K_1$, $K_P$ and Gc for the current loop compensation 108,120 (FIG. 2) for the current regulator and motor drive 20 within the motor control 14 (FIG. 1), discussed more hereinafter. The locked rotor test 252 may be the same as that described in co-pending U.S. patent application Ser. No. 08/996,234, filed contemporaneously herewith Then, a step 254 tests whether a fault was detected during the previous test or if a stop command has been received from the service tool 80. If a fault was detected or a stop command was received, the logic 48 exits.

Next, a step 256 tests whether certain motor parameters such as the rotor time constant $\tau_R$, the d-axis current reference $I_{dREF}$ (and thus Id) the motor torque constant $K_T^*$, and the transient inductance L$\sigma$, are available from the service tool 80, e.g., from the motor data sheet. If they are available, the second locked rotor test 258 is skipped and the logic 48 goes to the running rotor test 262. If the motor data sheet parameters are not available, the logic 48 performs the second locked rotor test 258 which calculates initial values for $\tau_R$, $I_{dREF}$ (and thus Id) and $K_T^*$, and calculates certain other motor parameters, such as L$\sigma$ and/or the stator resistance R1, discussed more hereinafter. The second locked rotor test 258 may be the same as that described in co-pending U.S. patent application Ser. No. 08/996,265, filed contemporaneously. herewith, discussed more hereinafter. Then, a step 260 tests whether a fault was detected during the previous test or if a stop command has been received from the service tool 80. If a fault was detected or a stop command was received, the logic 48 exits.

Next, the logic 48 performs the first running rotor test 262 which fine tunes the values for $\tau_R$, $I_{dREF}$ (and thus Id), and $K_T^*$, using the values for the parameters calculated form the test 258 or received from the service tool 80. The first running rotor test 262 may be the same as that described in co-pending U.S. patent application Ser. No. 08/996,266, filed contemporaneously herewith. Alternatively, The first running rotor test 262 may be the same as that described in co-pending U.S. patent application Ser. No. 08/996,263, filed contemporaneously herewith, and which is incorporated herein by reference in its entirety. Then a step 264 tests whether a fault was detected during the previous test or if a stop command has been received from the service tool 80. If a fault was detected or a stop command was received, the logic 48 exits.

Next, the logic 48 performs the second running rotor test 266 which calculates the value of the system inertia J*. The running rotor test 266 may be the same as that described in co-pending U.S. patent application Ser. No. 08/996,262, filed contemporaneously herewith, discussed more hereinafter. Then a step 268 provides some or all of the parameters calculated in the four tests 252,258,262,266 to the service tool 80 for use by service personnel. Each of the four tests makes up a portion of the auto-calibration logic 48, as described hereinafter, to compute the specific parameters for that test.

Figure 4:
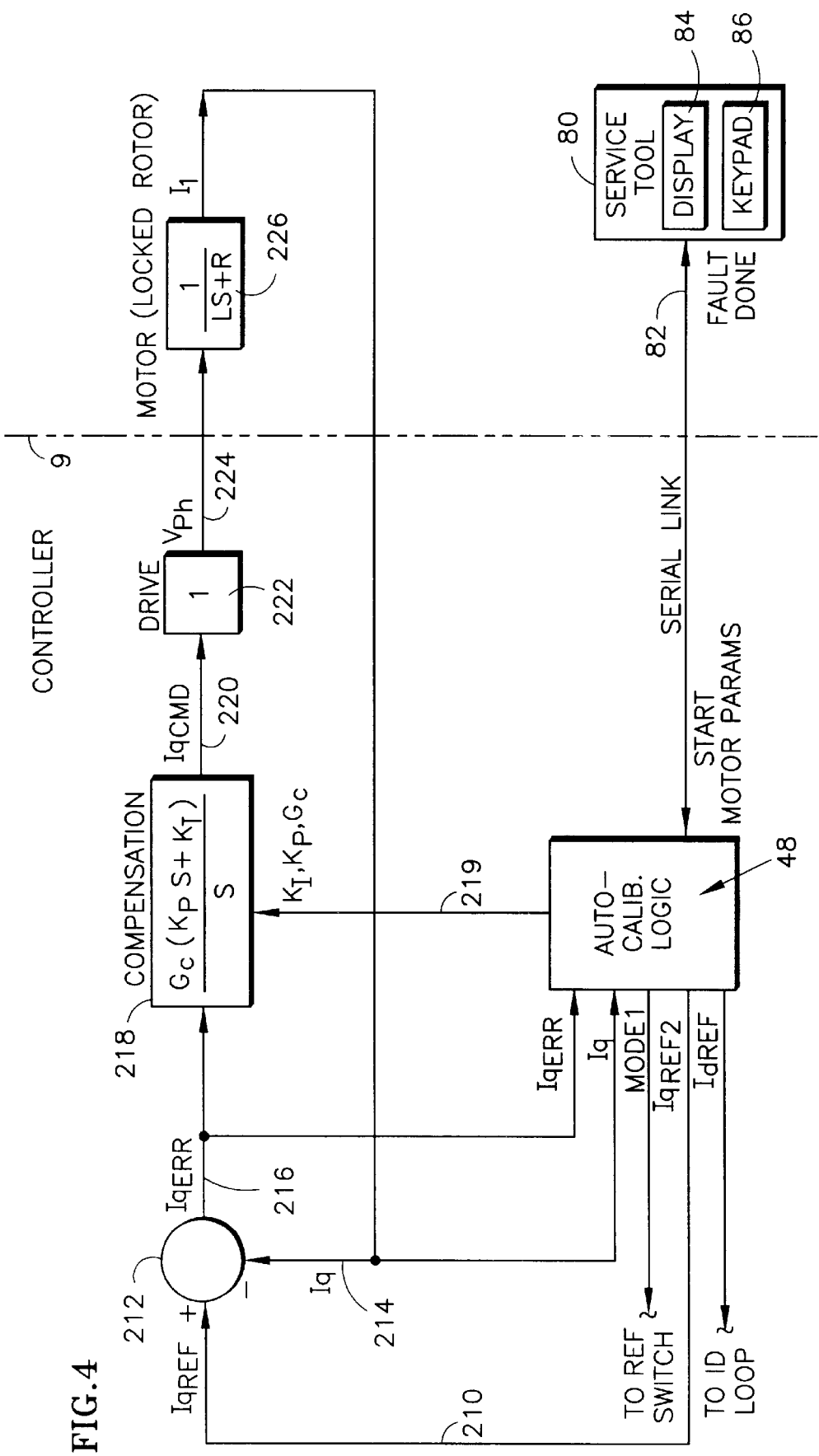
FIG. 4 is a control system block diagram of system of FIG. 1, in accordance with the present invention.

First Locked Rotor Test:

Referring to FIG. 4, a control system block diagram equivalent diagram of the q-axis current loop with the auto-calibration logic 48 of FIGS. 1 and 2 is shown when the MODE1 signal (FIG. 1) commands the switch 19 to set $I_{qREF}$ equal to $I_{qREF2}$ as the reference to the q-axis current loop (i.e., auto-calibration mode). Various portions of the control system of FIG. 4 may be analogized to the portions of the schematic block diagrams of FIGS. 1 and 2. In particular, the control system of FIG. 4 comprises the q-axis current reference signal $I_{qREF}$ on a line 210 (analogous to the line 18 of FIG. 2) from the auto-calibration logic 48, which is fed to the positive input of a summer 212 (analogous to the summer 114 of FIG. 2). The Iq current feedback signal on a line 214 is fed to the negative input of the summer 212. The summer 212 provides an error signal $I_{ERR}$ on a line 216 to a box 218 which represents the P-I control compensation (analogous to the q-axis loop compensation logic 120 in FIG. 2). The compensation 218 comprises a known proportional-plus-integral (P-I) control transfer function:

$$Gc(Kp+K_I/s) \qquad \text{Eq. 1}$$

where $K_I$ is the integral gain, $K_P$ is the proportional gain, Gc is the overall gain, and "s" is the known Laplace transform operator.

The compensation 218 provides a voltage command signal $V_{qCMD}$ on a line 220 to a box 222 indicative of the transfer function of the motor drive 111 (FIG. 2) which, in the frequency range of interest, has a transfer function of 1. The drive 222 provides a per-phase drive voltage Vph on a line 224 to a box 226 representing the transfer function of the motor 24 (FIG. 1). The transfer function of the motor 24 is approximated by a first order lag having an equation:

$$1/(Ls+R) \qquad \text{Eq. 2}$$

where L is the per-phase inductance of the motor, R is the per-phase resistance of the motor, and "s" is the Laplace transform operator. The motor 24 is a three-phase induction motor but may be any type of motor having a similar transfer function. The q-axis current Iq of the motor is indicated on a line 214 and is fed back to the summer 212. Iq is actually measured within the drive 111 (FIG. 2); however, the transfer function of the motor is part of the control system loop dynamics as shown in FIG. 3.

As discussed hereinbefore with FIGS. 1 and 2, the auto-calibration logic 48 provides $I_{qREF2}$ to the q-axis current loop on the line 210 (as well as the MODE1 and the $I_{dREF}$ signals), which in this case, is equal to the q-axis current loop reference $I_{qREF}$, receives the signals $I_{qERR}$, Iq on lines 216,214, respectively, (analogous to the lines 118,116 of FIG. 2) from the q-axis current loop, provides the control parameters $K_I,K_P,$Gc on lines 219 (analogous to lines 121 of FIG. 2) to the compensation block 218, and receives and provides parameters over the serial link 82.

Figure 5:
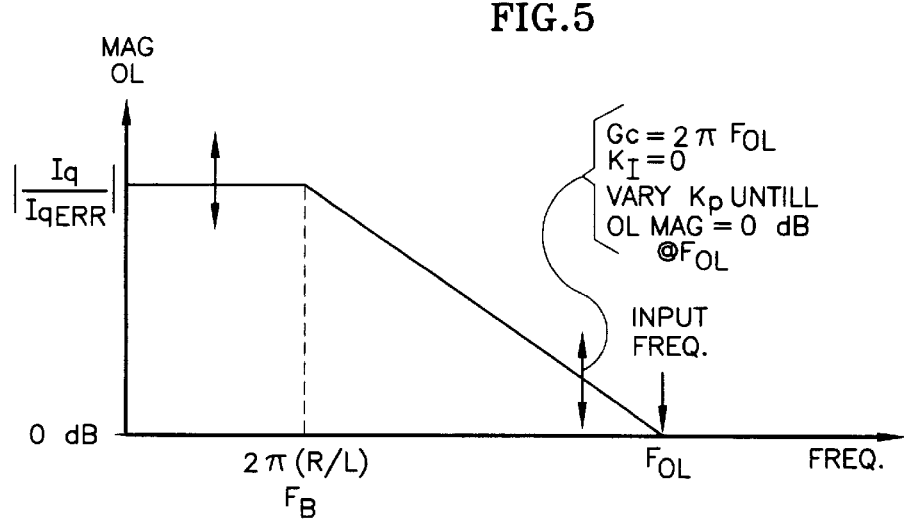
FIG. 5 is a plot of the magnitude frequency response of the open loop transfer function of the control system of FIG. 4, in accordance with the present invention.
Figure 6:
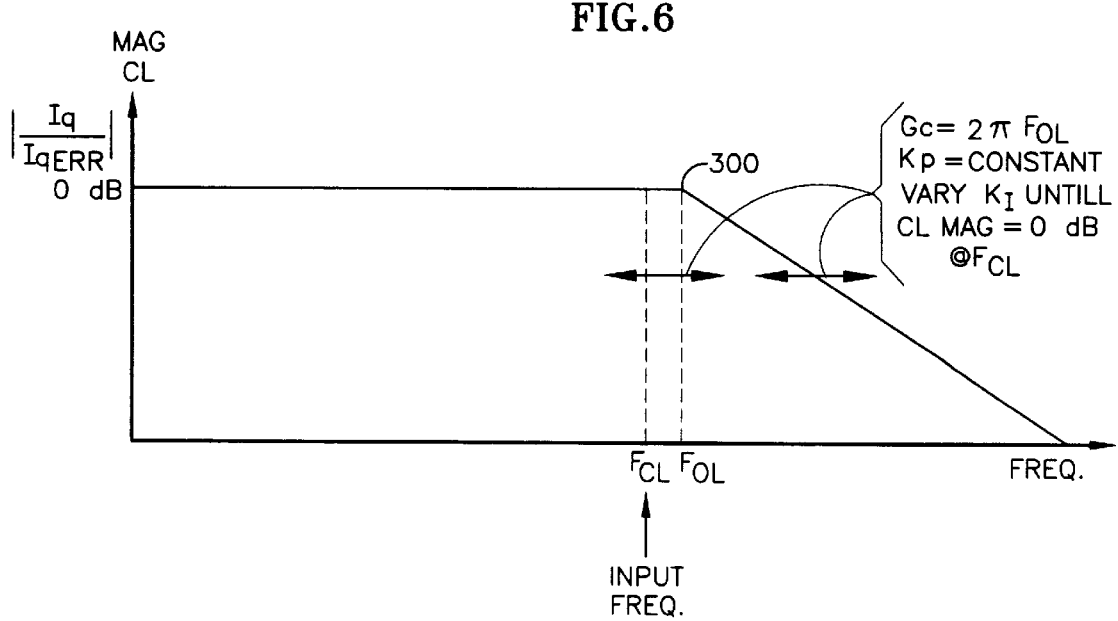
FIG. 6 is a plot of the magnitude frequency response of the closed loop transfer function of the control system of FIG. 4, in accordance with the present invention.

Referring to FIGS. 4, 5, and 6, for the first locked rotor test 252, the auto-calibration logic 48 sets Gc and adjusts $K_I$ and $K_P$ to obtain the desired overall drive/motor loop response without disconnecting or removing the motor. In particular, the open loop transfer function for the control system block diagram combines Eqs. 1 and 2 as follows:

$$\frac{Gc(K_P s + K_I)}{s} \times \frac{1}{Ls + R} \qquad \text{Eq. 3}$$

If $K_P$=L and $K_I$=R, the open loop transfer function of Eq. 3 reduces to Gc/s, an integrator with a gain Gc, which provides desirable loop performance of the motor control system. The resultant integrator has a magnitude (or gain) frequency response which crosses 1 (0 dB) at $\omega_C$(rad/sec)=Gc (i.e., the open loop cross-over frequency). Thus, the integrator gain Gc is set to equal the desired open loop cross-over frequency in rad/sec (i.e., Gc=$\omega_C$=2$\pi F_{OL}$). For a system with an open loop transfer function equal to an integrator, the frequency at which the open loop gain crosses through 1 (0 dB), i.e., the open loop cross-over frequency ($F_{OL}$), is equal to the frequency at which the closed loop response is less than 1 (0 dB) by a predetermined amount (e.g., 3 dB), i.e., the closed loop bandwidth.

The auto-calibration logic 48 receives the value of Gc and/or $F_{OL}$ over the link 82 from the service tool 80 (computes Gc or $F_{OL}$) and provides Gc to the circuit 20. The logic 48 also determines the value of $K_I$ and $K_P$ using a two-step process (discussed in more detail hereinafter with FIG. 7). First, the proportional gain $K_P$ is varied (or tuned) with the integral gain $K_I=0$ (or close to zero). The purpose of setting $K_I=0$ (or close to zero) is to eliminate or minimize the integrator portion of the compensation 108,120 from contributing to the system response during this first step of the process. Other techniques may be used if desired to minimize integrator contribution, such as temporarily switching the integrator out of the system, or holding the output of the integrator to zero.

A sinusoidal input signal is then provided as the reference current $I_{qREF}$ to the loop, where the input signal has a frequency $F_{OL}$ equal to the desired open loop cross-over frequency. The open loop magnitude is calculated by calculating the ratio of the signals $Iq/I_{qERR}$. Kp is varied until the magnitude of the open loop gain is within a predetermined tolerance of 1 (0 dB).

Referring to FIGS. 5 and 6, if the break frequency $F_B$ is sufficiently small compared to the open loop crossover frequency $F_{OL}$, the open loop response at the open loop crossover frequency resembles that of an integrator. Accordingly, the closed loop bandwidth (indicated by a point 300), i.e., the frequency at which the closed loop frequency response or gain begins to drop off or attenuate, will be substantially equal to the open loop crossover frequency $F_{OL}$.

Second, the integral gain $K_I$ is tuned with $K_P$ set to the value determined from the aforementioned first step. In that case, a sinusoidal input is provided as the reference current $I_{qREF}$ to the loop, where the input signal has a frequency $F_{CL}=0.8\ F_{OL}$, the desired closed loop bandwidth of the loop. Multipliers other than 0.8 may be used if desired based on the desired system response. $K_I$ is varied until the magnitude of the closed loop transfer function is within a predetermined tolerance of 1 (0 dB).

Figure 7:
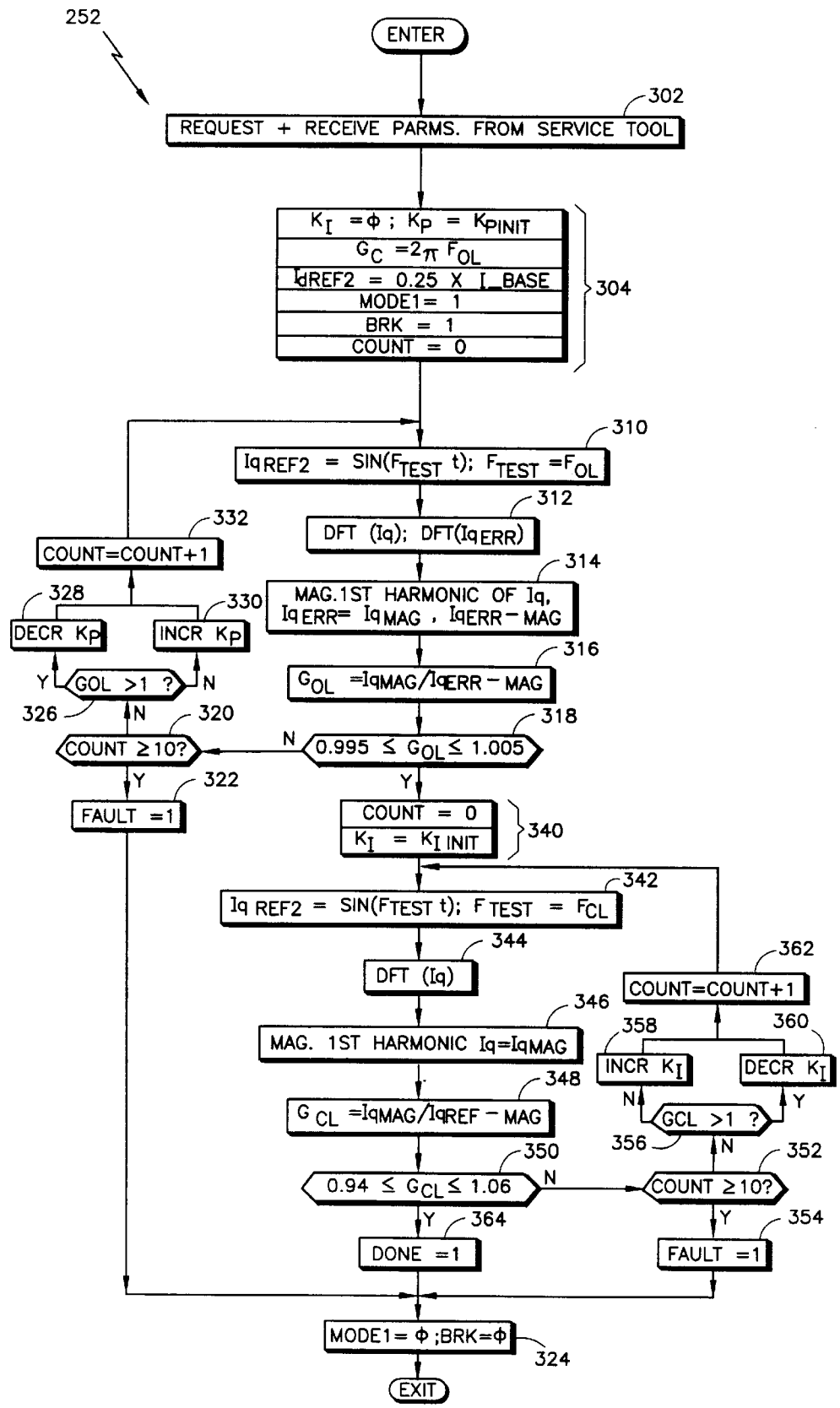
FIG. 7 is a logic flow diagram of the auto-calibration logic of FIG. 1, in accordance with the present invention.

Referring to FIG. 7, more specifically, a top-level flow diagram for the first locked rotor test 252 begins at a step 302 which requests and receives the necessary parameters to perform auto-calibration, discussed hereinafter. Next, a series of steps 304 sets $K_I=0$, $K_P=K_{P\_INIT}$, $Gc=2\pi F_{OL}$ and the value for $I_{dREF}$, as described below. Also, the steps 304 set a variable COUNT=0, set MODE1=1, and set BRK=1, which engages the brake 37 (FIG. 1) and locks the rotor.

The value of $K_{P\_INIT}$ is calculated using information from the motor nameplate and/or motor data sheet. As discussed hereinbefore, it is desired for $K_P$ to be equal to the motor inductance L. As an initial value, $K_{P\_INIT}$ is set based on an approximation of the motor transient inductance $L\sigma$, which is approximated based on a "base" inductance (L_BASE) of the motor, using the below equation:

$K_{P\_INIT}=0.1 \times L\_BASE$

L_BASE comprises both the magnetizing inductance ($L_m$) and the transient inductance ($L\sigma$), and $L\sigma$ is about 10–20% of $L_m$. Multipliers other than 0.1 may be used if desired. L_BASE is calculated from the motor nameplate data using the below equations:

$Z\_BASE=(PWR\_RATED)/(VLL\_RATED)^2$ $L\_BASE=Z\_BASE/(2\pi HZ\_RATED)$ where PWR_RATED is the rated motor shaft power in watts; RPM_RATED is the rated motor speed in RPM; VLL_RATED is the rated RMS line-to-line voltage in volts; and HZ_RATED is the rated frequency in hertz.

The initial value of $I_{dREF}$ is set as follows:

$I_{dREF}=0.25 \times L\_BASE$ where I_BASE is the motor "base" current calculated from nameplate data as $(PWR\_RATED)/((3)^{1/2} \times VLL\_RATED)$. Other settings may be used for $I_{dREF}$ if desired, provided the appropriate amount of flux is generated in the motor.

The values of $K_{P\_INIT}$ and $I_{dREF}$ may be calculated by the logic 252 using the nameplate parameters PWR_RATED, RPM_RATED, VLL_RATED, and HZ_RATED, entered into the service tool 80 by service personnel and sent over the link 82 to the logic 48. Alternatively, the values of $K_{P\_INIT}$ and $I_{dREF}$ may be calculated by service personnel and entered into the service tool 80 and sent over the link 82 to the logic 48.

Next, a step 310 sets $I_{qREF2}$ equal to a sinewave having a test frequency of $F_{OL}$ equal to the desired open loop crossover frequency, e.g., 180 to 333 Hz. Other frequencies may be used if desired. The sinusoid is generated digitally by a signal processor, such as a digital signal processor, e.g., Motorola DSP 56002 processor, with an update (or sample) rate of 5 KHz. Other hardware and/or software techniques or update rates may be used to generate the sinusoidal input signals.

Next a step 312 monitors the signals $I_{qERR}$ and $I_q$ on the lines 118, 116, respectively, and uses the aforementioned digital signal processor to perform a Discrete Fourier Transform (DFT) of the individual signals $I_{qERR}$ and $I_q$ to obtain the magnitude of the fundamental or first harmonic of the $I_{qERR}$ and $I_q$ signals ($I_{qMAG}$, $I_{qERR-MAG}$) to calculate the open loop gain. The first harmonic is used to calculate the open loop gain so that non-linearities in the control system do not distort the calculation. The fundamental or first harmonic component of a measured signal from a DFT, as is known, is $A\sin(\omega t)+B\cos(\omega t)$ where $\omega$ is the test frequency ($2\pi F_{OL}$). Next a step 314 calculates the magnitude of the first harmonic by the known equation: $(A^2+B^2)^{1/2}$.

To compute a DFT, as is known, standard sine and cosine waves of unit amplitude at the test frequency are generated within the logic 48. The measured signal (e.g., $I_{qERR}$, $I_q$) is multiplied by the standard sinewave and the product is integrated over one period of the excitation to yield the Fourier series coefficient A of the signal. Multiplying the signal by the standard cosine and integrating yields the B coefficient. We have found that integrating over 15 periods of the input signal it is sufficient to filter out any transients in the system response. This also applies to the DFT performed for the closed loop gain, discussed hereinafter. Other numbers of periods may be used if desired. Also, other types of Fourier transforms may be used if desired, e.g., a Fast Fourier Transform (FFT), etc., provided the first harmonic of the desired signal is obtained. Further, instead of a Fourier transform, any other filtering or spectrum analysis technique may be used for determining the first harmonic of the desired signals.

Next, a step 316 calculates the open loop gain $G_{OL}$ as the ratio of the magnitude of the current feedback signal $I_{qMAG}$ to the magnitude of the current loop error $I_{qERR-MAG}$.

Next, a step 318 checks whether $G_{OL}$ is within +/−0.5% of 1 (i.e., +/−0.005). Other tolerances may be used. If not, a step 320 tests whether COUNT is greater than or equal to ten, i.e., whether the loop has iterated at least ten times. If it has iterated ten times, a step 322 sets FAULT=1 which is sent to the service tool 80 (FIG. 3) over the serial link 82 and a step 324 sets MODE1=0, BRK=0, and the logic exits. If the logic has iterated less than ten times, a step 326 checks if $G_{OL}$ is greater than one. If $G_{OL}$ is greater than one, $K_P$ is decremented by a predetermined amount at a step 328. If $G_{OL}$ is less than one, $K_P$ is incremented by a predetermined amount at a step 330. In either case, next a step 332 increments the counter COUNT by one and the logic goes to the step 310 to recalculate $G_{OL}$ with a new value of $K_P$.

One way to iterate $K_P$ is to use a binary search technique where the value of $K_P$ is determined by setting it equal to the average of an upper and lower bound after each test. The upper or lower bound is adjusted to reduce the search interval by a factor of two each time until the desired threshold is obtained. For example, the upper bound Kp-upper=$3K_{P\text{-}INIT}$ and the lower bound Kp-lower=0, and Kp=(Kp-upper+Kp-lower)/2. If Kp is to be increased (step 330), the lower bound is increased to Kp-lower=Kp, and if Kp is to be decreased (step 328), the upper bound is decreased to Kp-upper=Kp. Then, the next value of Kp is calculated based on the modified upper or lower bounds.

Alternatively, Kp may be changed by a small amount e.g., 1%, each iteration until the desired tolerance is reached. Any other search techniques that converges within the desired time may be used if desired.

If the value of GOL is within the desired predetermined tolerance in the step 318, the integral gain $K_I$ is then determined based on the desired closed loop frequency response to a sinusoidal input frequency. In particular, a series of steps 340 sets COUNT=0 and KI=KI-INIT.

To determine the value for $K_I$, the value for $K_p$ is set to the value determined in the aforementioned first step in the process and $K_I$ is set to an initial value $K_{I\text{-}INIT}$. Because it is desired for $K_I$ to be equal to the motor resistance R, the value for $K_{I\text{-}INIT}$ is set to an estimated value for R of:

$$K_{I\text{-}INIT}=1000 \times K_P$$

Multipliers other than 1000 may be used to estimate $K_{I\text{-}INIT}$.

Next, a step 342 sets $I_{qRIF2}$ equal to a sinewave having a test frequency of $F_{CL}=0.8 \times F_{OL}$ equal to the desired closed loop bandwidth and $I_{dREF}$ is still set as before. The sinusoid is generated as described hereinbefore with the open loop test of step 310.

Next a step 344 monitors the feedback current signal Iq on the lines 116 and computes the discrete Fourier transform (DFT) of the signal Iq to obtain the magnitude of the fundamental or first harmonic of the Iq signal ($I_{qMAG}$) used to calculate the closed loop gain so that non-linearities in the control system do not distort the calculation, in a similar fashion to that done for the open loop gain discussed hereinbefore. The fundamental or first harmonic component of a measured signal from a DFT, as is known, is x=Asin($\omega$t)+Bcos($\omega$t) where $\omega$ is the test frequency ($2\pi F_{CL}$). Next, a step 346 calculates the magnitude of the first harmonic by the known equation: $(A^2+B^2)^{1/2}$. The number of integration periods for the DFT are the same as that discussed hereinbefore.

Next, a step 348 calculates the closed loop gain $G_{CL}$ as the ratio of the magnitude of the current feedback signal $I_{qMAG}$ to the magnitude of the input current loop reference signal $I_{qMAG}$ (which was provided by the logic 48, and thus need not be measured).

Next, a step 350 checks whether $G_{OL}$ is within +/-6% of 1. Other tolerances may be used. If not, a step 352 tests whether COUNT is greater than or equal to ten, i.e., whether the loop has iterated at least ten times. If it has iterated ten times, a step 354 sets FAULT=1 which is sent to the service tool 80 (FIG. 3) over the serial link 82 and a step 324 sets MODE1=0, BRK=0, and the logic exits. If the logic has iterated less than ten times, a step 356 checks if $G_{CL}$ is greater than one. If GCL is greater than one, $K_I$ is decremented by a predetermined amount at a step 360. If $G_{CL}$ is less than one, $K_I$ is incremented by a predetermined amount at a step 358. In either case, next a step 362 increments the counter COUNT by one and the logic goes to the step 342 to recalculate $G_{CL}$ with a new value of $K_I$.

One way to iterate $K_I$ is to use a binary search technique similar to that discussed regarding the iteration of $K_P$ hereinbefore, where the value of $K_I$ is determined by setting it equal to the average of an upper and lower bound after each test. The upper or lower bound is adjusted to reduce the search interval by a factor of two each time until the desired threshold is obtained. For example, the upper bound $K_I$-upper=$2K_{I\text{-}INIT}$ and the lower bound $K_I$-lower=0, and $K_I$=($K_I$-upper+$K_I$-lower)/2. If $K_I$ is to be increased (step 358), the lower bound is increased to $K_I$-lower=$K_I$, and if $K_I$ is to be decreased (step 360), the upper bound is decreased to KI-upper=$K_I$. Then, the next value of $K_I$ is calculated based on the modified upper or lower bounds.

Alternatively, $K_I$ may be changed by a small amount e.g., 1%, each iteration until the desired tolerance is reached. Any other search or iteration techniques that converges within the desired time may be used if desired.

We have found that the binary search discussed hereinbefore for $K_P$ and $K_I$ will converge within about eight iterations which is sufficiently accurate; however, more or less iterations may be used if desired.

If $G_{CL}$ is within the desired tolerances in step 350, then a step 364 sets the DONE flag equal to 1 which is transmitted via the serial link 82 to the service tool 80, a step 324 sets MODE1=0, BRK=0, and the logic 252 exits.

Other closed loop bandwidths and open loop cross-over frequencies and other input frequencies may be used if desired, e.g., the input frequency may be equal to $F_{OL}$ for both calculations if desired.

Figure 8:
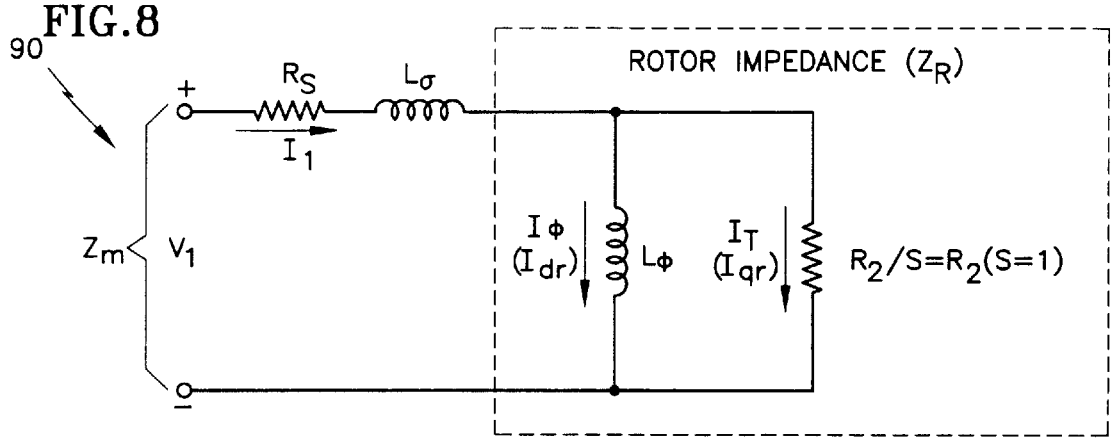
FIG. 8 is a schematic drawing of an equivalent circuit model of an induction motor controlled by field orientation, in accordance with the present invention.

Second Locked Rotor Test:

Referring to FIG. 8, a known equivalent circuit 90 of an induction motor is similar to that described in "Vector Control and Dynamics of AC Drives", Novotny and Lipo, Oxford 1996, Chapter 5. FIG. 8 is a per-phase equivalent circuit for AC steady state operation where the current I1 and voltage V1 are phasor quantities. The circuit 90 comprises a resistor Rs in series with an equivalent "transient" inductor L$\sigma$ in series with a rotor impedance $Z_R$ which comprises a "magnetizing" inductance L$\phi$ in parallel with an equivalent resistance $R_2$/S. Where:

Rs (or $R_1$)=stator winding resistance

Ls=stator winding inductance

Lr=rotor winding inductance

Lm=mutual inductance

Rr=the rotor winding resistance

L$\sigma$=Ls—$Lm^2$/Lr=transient inductance

L$\phi$=$Lm^2$/Lr=magnetizing inductance $\omega_E$=electrical frequency of the input current $I_1$ $\omega_R$=motor output rotational speed in radians per second referred to an electrical reference frame S=Slip=$(\omega_E-\omega_R)/\omega_E$ $\omega_S$=slip frequency=$\omega_E-\omega_R$=$(1/\tau_R)$(Iq/Id)
  where $\tau_R$=rotor time constant Iq=q-axis (or torque) current, and Id=d-axis (or magnetizing) current $R_2$=$(Lm^2/Lr^2)$*Rr Also, the rotor time constant TR and motor torque constant $K_T$* are related to the parameters of the circuit 90 as follows:

$$\tau_R = Lr/Rr = L\phi/R_2$$

$$K_T^* = (3/2)(P/2) \, L\phi Id = \text{torque/current}$$

where P=number of poles.

Figure 9:
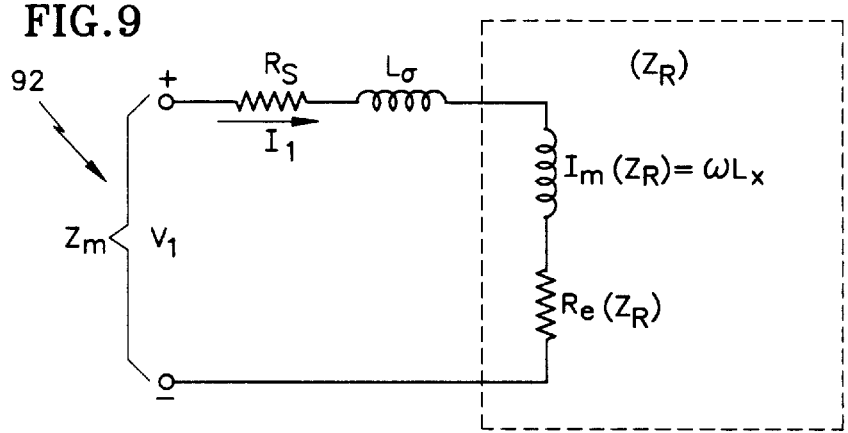
FIG. 9 is a simplified schematic diagram of the equivalent circuit of FIG. 8, in accordance with the present invention.

Referring to FIG. 9, the circuit 92 is an equivalent to the circuit 90 of FIG. 8 with the rotor impedance $Z_R$ transformed into an equivalent series circuit impedance having a real part Real($Z_R$) and an imaginary part Imag($Z_R$) equal to $\omega LX$. The equivalent circuit 92 with the transformation of $Z_R$ is useful for determining the rotor time constant $\tau_R$ (discussed more hereinafter).

Figure 10:
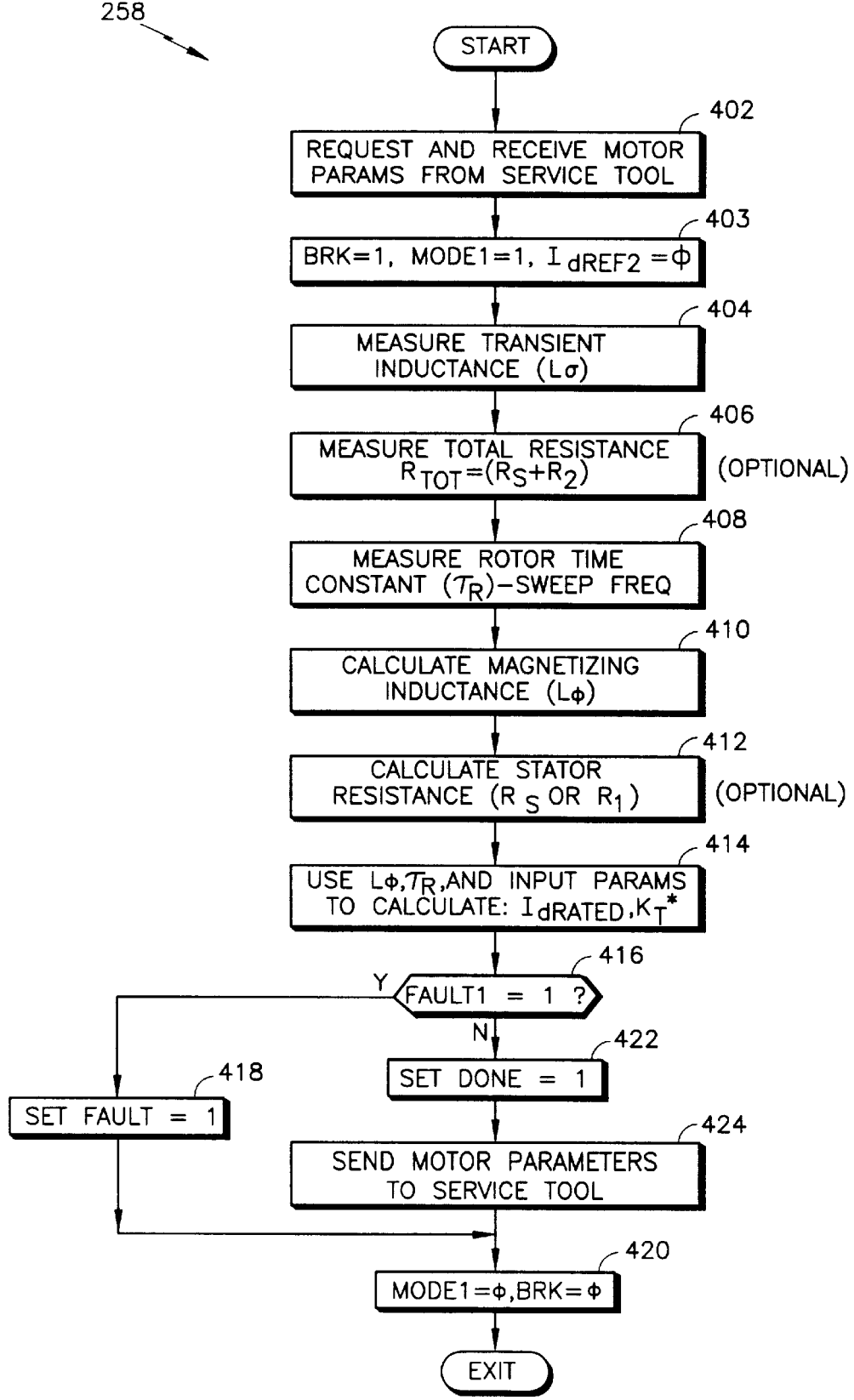
FIG. 10 is a logic flow diagram of the auto-calibration logic of FIG. 1, in accordance with the present invention.

Referring now to FIG. 10, a top level flow chart for the second locked rotor test 258 begins at a step 402 which requests and receives motor parameters from the service tool 80 over the link 82 (FIG. 1), which are entered by service personnel. The motor parameters received are: the rated motor shaft power in watts (PWR_RATED); the rated motor speed in rpm (RPM_RATED); the rated rms line-to-line voltage in volts (VLL_RATED); the rated frequency in hertz (HZ_RATED); and number of poles (POLES), all of which may be obtained from the motor nameplate data.

Then, a step 403 sets MODE1=1, BRK=1 to cause the brake 37 (FIG. 1) to lock the rotor, and $I_{dREF2}$=0 amps. For each of the tests described herein, the rotor remains locked (rotor speed $\omega_R$=0) and $I_{dREF2}$=0 amps. When $\omega_R$=0 and $I_{dREF2}$=0 the slip S=1, and the motor current $I_1$ is equal to the q-axis current Iq and the motor voltage $V_1$ is equal to the q-axis voltage Vq. When Iq=0, the motor is operated in single phase operation, in accordance with the circuits of FIGS. 8,9.

Next, a step 404 measures the transient inductance L$\sigma$, by providing a sinusoidal current signal into the q-axis of the reference current $I_{qREF2}$ on the line 17 (FIG. 1) at a frequency $F_{HIGH}$ high enough such that the motor impedance will be dominated by the transient inductance L$\sigma$, e.g., 31.25 Hertz. Other frequencies may be used if desired, e.g., greater than 30 Hz. The sinewave input signal is generated digitally by a signal processor, such as a digital signal processor, e.g., a Motorola DSP 56002 processor, with an update (or sample) rate of 5 KHz. Other hardware and/or software techniques or update rates may be used to generate the sinusoidal input signals.

The step 404 reads the q-axis feedback current Iq and the q-axis output voltage Vq (equal to the motor current $I_1$ and motor voltage $V_1$, respectively, as discussed hereinbefore). Next, the step 404 uses the aforementioned digital signal processor to perform a Discrete Fourier Transform (DFT), similar to that discussed hereinbefore, of Iq and Vq to determine the first harmonic Fourier coefficients. The fundamental or first harmonic component of a measured signal from a DFT is A sin($\omega$t)+B cos($\omega$t), where $\omega$=2$\pi$f is the input frequency (in rad/sec). The first harmonic is used to calculate the impedance primarily so that non-linearities in the system do not distort the calculation.

To compute a DFT, as is known, standard sine and cosine waves of unit amplitude at the test frequency are generated within the logic 48. The measured signal (Iq,Vq) is multiplied by the standard sinewave and the product is integrated over one period of the excitation to yield the Fourier series coefficient A of the signal. Multiplying the signal by the standard cosine and integrating yields the B coefficient. We have found that integrating over 15 periods of the input signal it is sufficient to filter out any transients in the system response. Other numbers of periods may be used if desired. Also, for any DFT discussed herein, other types of Fourier transforms may be used if desired, e.g., a Fast Fourier Transform (FFT), etc., provided the first harmonic of the desired signal is obtained. Further, instead of a Fourier transform, any other filtering or spectrum analysis technique may be used for determining the first harmonic of the desired signals.

Then, the step 404 computes the motor impedance $Z_M$ by calculating the ratio of voltage to current ($V_1/I_1$=Vq/Iq) using the first harmonic components of voltage and current computed above. The step 404 then computes the real and imaginary parts of $Z_M$ from the Fourier coefficients. The imaginary part of the motor impedance $Z_M$ at $F_{HIGH}$ Hertz is dominated by the transient inductance term $\omega L\sigma$. Thus, the transient inductance L$\sigma$ is the transient reactance (or imaginary part of $Z_M$) with the input frequency equal to $F_{HIGH}$ Hz, divided by the frequency $\omega$ in radians/sec (2$\pi$ $F_{HIGH}$), or:

$$L\sigma = \text{Imag}(Z_M)@F_{HIGH} \text{ Hz}/(2\pi F_{HIGH})$$

Next, an optional step 406 measures the total resistance of the circuit impedance ($R_{TOT}$=$R_S$+$R_2$), i.e., the sum of the stator and rotor resistances, as the real part of the motor impedance $Z_M$ determined in step 404. Thus:

$$R_{TOT} = \text{Real}(Zm)@F_{HIGH}$$

In particular, at the relatively high frequency $F_{HIGH}$ used in step 404, the inductance L$\phi$ in the circuit 90 is large and the real part of $Z_M$ will be equal to $R_{TOT}$. The value of $R_{TOT}$ is saved for later use to calculate Rs (see step 412).

Next, a step 408 measures the rotor time constant $\tau_R$ as follows. The step 408 produces a progression of low frequency sinusoidal input q-axis reference currents $I_{qREF2}$ from 0.1 to 8.0 Hertz in increments defined by a search algorithm, discussed hereinafter. The sinewave input signal is generated digitally as discussed hereinbefore with step 404. At each frequency, the motor current Iq and voltage Vq (equal to the motor current $I_1$ and voltage $V_1$, respectively, as discussed hereinbefore) are measured and a DFT of the current $I_1$ and the motor voltage $V_1$ signals are computed separately. The fundamental or first harmonic Fourier coefficients are obtained as discussed hereinbefore with step 404.

Then, the step 408 computes the motor impedance $Z_M$ at each frequency by calculating the ratio of voltage to current ($V_1/I_1$). The step 408 then calculates the real and imaginary parts of the $Z_M$ from the Fourier coefficients. Then, the step 408 calculates the imaginary part of the rotor impedance Imag($Z_R$)=$\omega$Lx by subtracting the transient reactance ($\omega L\sigma$) from the imaginary part of the motor impedance $Z_M$, where L$\sigma$ was previously calculated in step 404 and $\omega$ is the input frequency, as follows:

$$\text{Imag}(Z_R) = \omega Lx = \text{Imag}(Z_M) - \omega L\sigma$$

Figure 11:
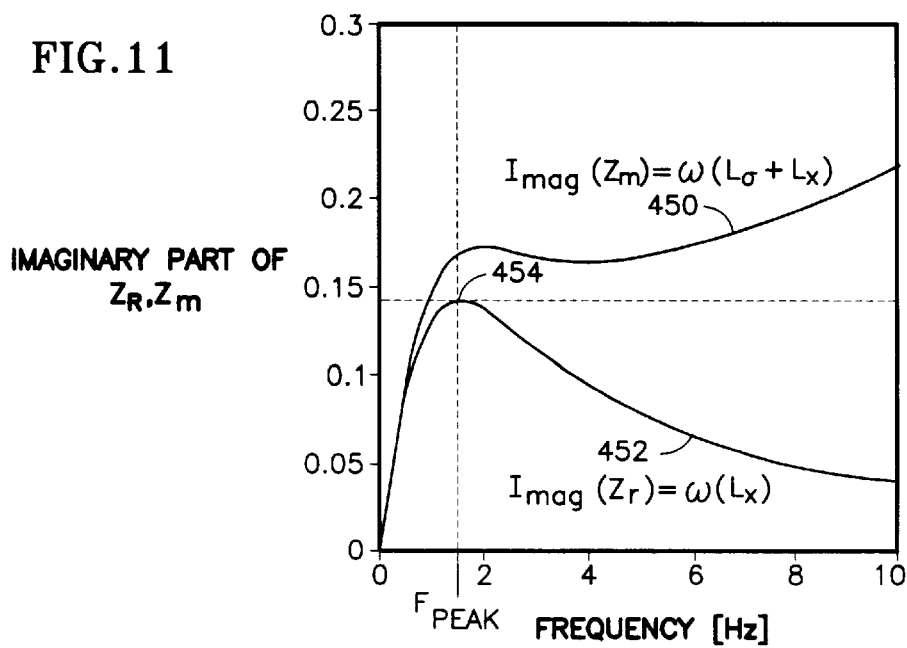
FIG. 11 is a graph of the imaginary part of the rotor impedance and of the motor impedance versus frequency, in accordance with the present invention.

Referring to FIG. 11, a curve 450 shows the imaginary part of the motor impedance Imag($Z_M$)=$\omega$(L$\sigma$+Lx) and a curve 452 shows the imaginary part of the rotor impedance Imag($Z_R$)=$\omega$Lx. The frequency $\omega$ (radians/second) at which the maximum 454 of the curve 452 occurs is the inverse of the rotor time constant, i.e., $\omega$=1/$\tau_R$. A known search algorithm, e.g., a "golden section line search" algorithm, varies the input frequency and determines the frequency Fpeak at which the maximum value of $\omega$Lx occurs. The type of search algorithm used is not critical to the present invention, and any search algorithm that varies an input parameter and determines the maximum value of an output parameter may be used. The rotor time constant TR is then calculated as follows:

$$\epsilon_R = 1/\omega\text{peak} = 1/(2\pi F\text{peak})$$

Next a step 410 calculates the magnetizing inductance L$\phi$. In particular, at the frequency of rotor time constant ($\omega$=1/

$\tau_R$), which is also the break frequency of the motor transfer function, the real and imaginary parts of the rotor impedance $Z_R$ are equal to each other, i.e., $\omega L_X = R_X$. Also, at this same frequency, it can be shown (below) that the $\omega L_X$ is also equal to ½$\omega L\phi$ (the magnetizing reactance). In particular, the rotor impedance $Z_R$ is equal to $j\omega L\phi$ in parallel with $R_2$, as shown below:

$$Z_R = j\omega L\phi R_2/(R_2 + j\omega L\phi)$$

Multiplying the numerator and denominator by the complex conjugate of the denominator ($R_2 - j\omega L\phi$), gives $$Z_R = \omega^2 L\phi^2 R_2/(R_2^2 + \omega^2 L\phi^2) + j\ \omega L\phi R_2^2/(R_2^2 + \omega^2 L\phi^2) \qquad \text{Eq. 4}$$

Which has the form of a series combination of impedances, or a real and imaginary part as indicated below:

$$Z_R = Rx + j\omega Lx$$
$$Z_R = \text{Real} + j\ \text{Imaginary}$$

At the peak 454 of the curve 452 of Imag($Z_R$), the real and imaginary parts are equal, which gives:

$$\omega^2 L\phi^2 R_2/(R_2^2 + \omega^2 L\phi^2) = \omega L\phi R_2^2/(R_2^2 \omega^2 L\phi^2) \qquad \text{Eq. 5}$$

Simplifying Eq. 5, gives:

$$\omega L\phi = R_2$$

Substituting $R_2 = \omega L\phi$ into the Imaginary part of $Z_R$, and setting equal to $\omega Lx$, gives:

$$\text{Imag}(Z_R) = (\omega L\phi)(\omega^2 L\phi^2)/(\omega^2 L\phi^2 + \omega^2 L\phi^2) = \omega Lx \qquad \text{Eq. 6}$$

Simplifying Eq. 6, gives:

$$\omega Lx = \omega L\phi/2 \qquad \text{Eq. 7}$$

Thus, the magnetizing inductance $L\phi$ is calculated as follows:

$$L\phi = 2\text{Imag}(Z_R)/\omega @ \ \omega = 1/\tau_R$$

Next, an optional step 412 calculates the stator resistance $R_S$ by first calculating the value of $R_1$. It can be shown (below) that the real part of the rotor impedance Real($Z_R$) at $\omega = 1/\tau_R$ is equal to $R_2/2$. In particular, the real part of Eq. 4 is:

$$\text{Real}(Z_R) = Rx = L\phi^2 R_2/(R_2^2 + \omega^2 L\phi^2)$$

Substituting $R2 = \omega L\phi$, and simplifying, gives:

$$Rx = R_2/2$$

Thus, $$R_2 = 2\text{Real}(Z_R) @ \ \omega = 1/\tau_R$$

Alternatively, $R_2$ may be calculated using the equation:

$$R_2 = L\phi/\tau_R$$

where $L\phi$ and $\tau_R$ were previously calculated in steps 404, 408, respectively. In either case, the stator resistance $R_S$ is then determined by subtracting R2 from the total resistance ($R_{TOT} = R_S + R_2$) calculated in step 406. Thus, $$R_S = R_{TOT} - R_2$$

If the value for $R_S$ for the motor is already known, e.g., from the data sheet, it may be provided to the control over the link 82 and then $R_S$ may also be range checked in the step 412 to ensure it is within a predetermined percentage of the expected value. If $R_S$ is not within the desired range, the step 412 sets a fault flag FAULT1=1. Alternatively, the value of $R_S$ may be calculated and provided to the service tool to help service personnel determine the type of motor installed in the system.

Next, a step 414 uses $L\phi$, $\tau_R$, and the input parameters PWR_RATED, RPM_RATE), VLL_RATED, HZ_RATED, and POLES, obtained in the step 402, to simulate motor parameters and to iterate and calculate the rated magnetizing current $I_{dRATED}$, and the torque constant $K_T^*$, as shown in FIG. 7.

Figure 12:
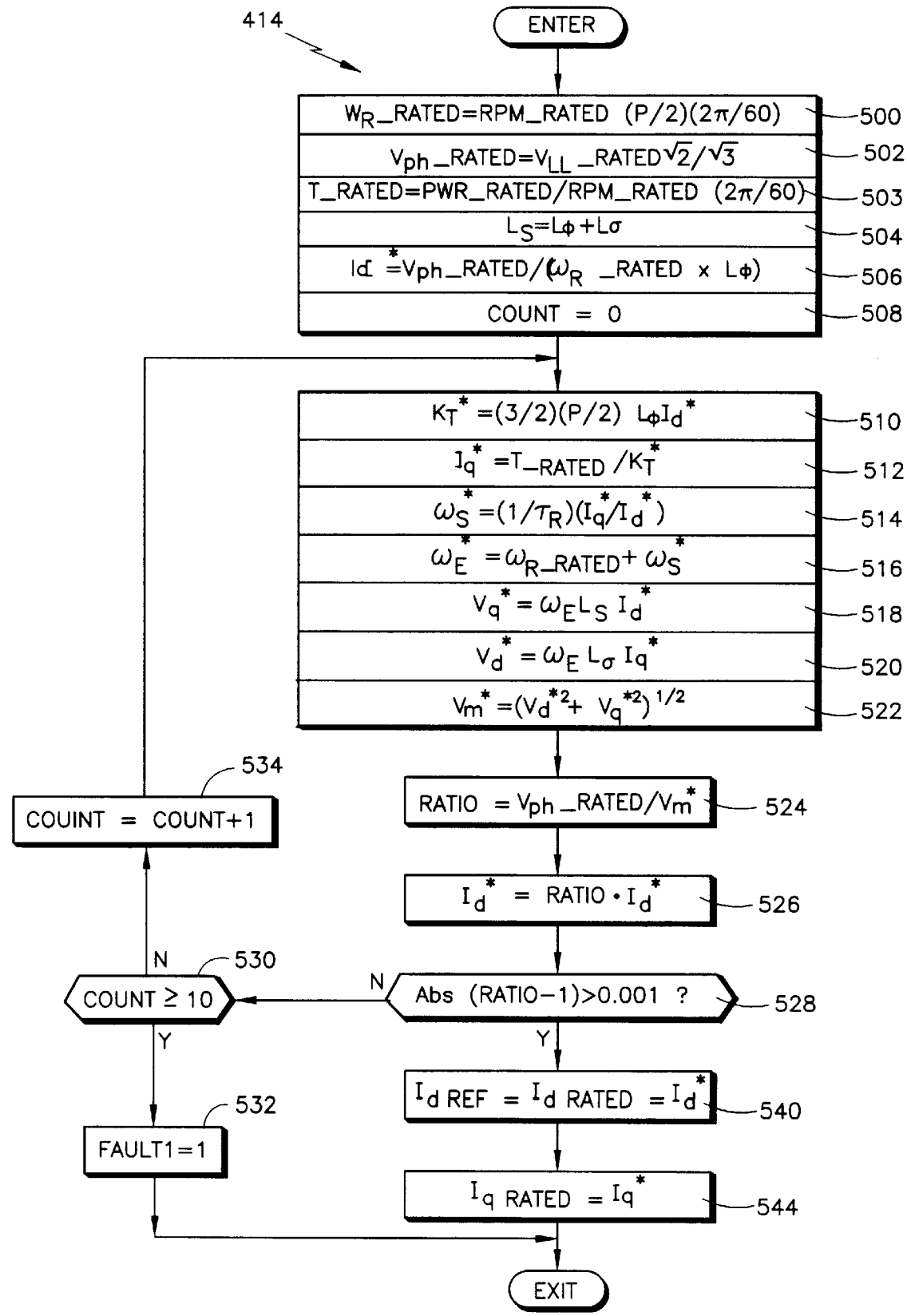
FIG. 12 is a logic flow diagram of a portion of the flow diagram of FIG. 10, in accordance with the present invention.

Referring to FIG. 12, the simulated motor parameters are indicated by an asterisk (*) to avoid confusion with actual measured motor parameters discussed hereinbefore. In particular, a step 500 calculates the rated rotational speed of the motor referred to the electrical reference frame $\omega_R$_RATED. Next, a step 502 converts rated line-to-line voltage (VLL_RATED) to rated line-to-neutral voltage (or per-phase voltage) Vph_RATED. Next, a step 503 calculates the rated torque T_RATED based on rated power and rated RPM. Then, a step 504 calculates the stator inductance Ls as the sum of the transient inductance $L\sigma$ and the magnetizing $L\phi$. Next, a step 506 calculates an initial value for simulated d-axis current Id* based on a first order approximation of Id using rated voltage and speed. Next, a step 508 sets a variable COUNT equal to zero.

Next, a series of steps 510–522 calculates $K_T^*$ and a simulated motor voltage $V_M^*$ using various simulated motor parameters based on the value of $L\phi$ calculated in step 410 (FIG. 10), the parameters calculated in steps 500–508 above, and using known relationships for a field-oriented motor controller, some of which are discussed hereinbefore. In particular, a step 510 calculates the torque constant $K_T^*$ based on $L\phi$ calculated in step 410 (FIG. 10) and the current value of the magnetizing current Id*. Next, a step 512 calculates the torque current Iq*. Next, a step 514 calculates a simulated slip frequency $\omega_S^*$ which is used in a next step 516 to calculate a simulated electrical current frequency $\omega_E^*$ which is equal to the rotational frequency (or speed) of the motor (emulated as the rated speed) $\omega_R$_RATED plus the slip frequency $\omega_S^*$.

Next, a step 518 calculates a simulated q-axis output voltage Vq* based on the magnetizing current Id* and a step 520 calculates a simulated d-axis output voltage Vd* based on the torque current Iq*. Then, a step 522 calculates a simulated vector sum total motor voltage Vm* equal to the square root of the sum of the squares of the d-axis and q-axis output voltages Vd*, Vq*, respectively.

Next, a step 524 calculates a Ratio parameter equal to the ratio of the rated phase voltage Vph_RATED to the simulated per-phase motor voltage Vm*. The logic iterates until the Ratio goes to 1 within the desired tolerance, e.g., 0.001. When the ratio equals 1 the value of Id* will produce the rated voltage at the rated RPM and rated torque.

Next, a step 526 calculates a next value for Id* equal to the value of the Ratio times the current value of Id*. Next, a step 528 checks whether Ratio is within a predetermined tolerance of 1, e.g., 0.001. If it is not within the desired tolerance, a step 530 checks whether COUNT is greater than or equal to ten (i.e., whether the loop has iterated at least ten times). If the loop has iterated at least ten times, a FAULT flag is set equal to 1 at a step 532 and output to the service tool 80 over the link 82 (FIG. 1) and the logic is exited. If it has iterated less than ten times, a step 534 increments COUNT by one and the logic 414 goes the step 510 to iterate again.

If Ratio is within the desired tolerance in step 528, the logic is deemed to have converged and at convergence the values of Id* and Iq* are equal to the rated d-axis current $I_{dRATED}$ and the rated q-axis current $I_{qRATED}$, respectively. Accordingly, a step 540 sets the d-axis current reference $I_{dREF}$ equal to Id* which is equal to $I_{dRATED}$ and a step 544 sets $I_{qRATED}$ equal to Iq*. Then the logic 414 exits and returns to the logic 258 of FIG. 10.

Referring to FIG. 10, next, a step 416 determines whether an error has been detected in any of the above steps 402–414 (i.e., if FAULT1=1). If a fault has been detected, a step 418 sets FAULT=1 which is sent to the service tool 80 (FIG. 1) over the serial link 82 and a step 420 sets MODE1=0, BRK=0, and the logic exits. If a fault has not occurred, a step 422 sets the DONE flag equal to 1 which is transmitted via the serial link 82 to the service tool 80. Next, some or all of the motor parameters $\tau_R$, $K_T^*$, $I_{dRATED}$, $L\sigma$, $L\phi$, Rs, and $I_{qRATED}$ are transmitted via the serial link 82 to the service tool 80 in a step 424. The service tool 80 displays the parameters for use by the service personnel. Next, the step 420 sets MODE1=0, BRK=0, and the logic 258 exits.

Figure 14:
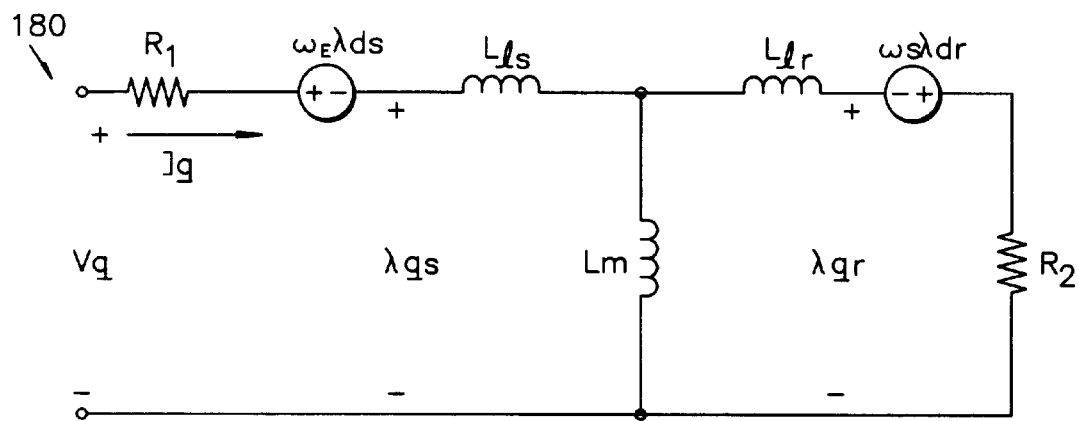
FIG. 14 is an induction motor coupled circuit diagram for q-axis variables for a field-oriented driven motor, in accordance with the present invention.
Figure 15:
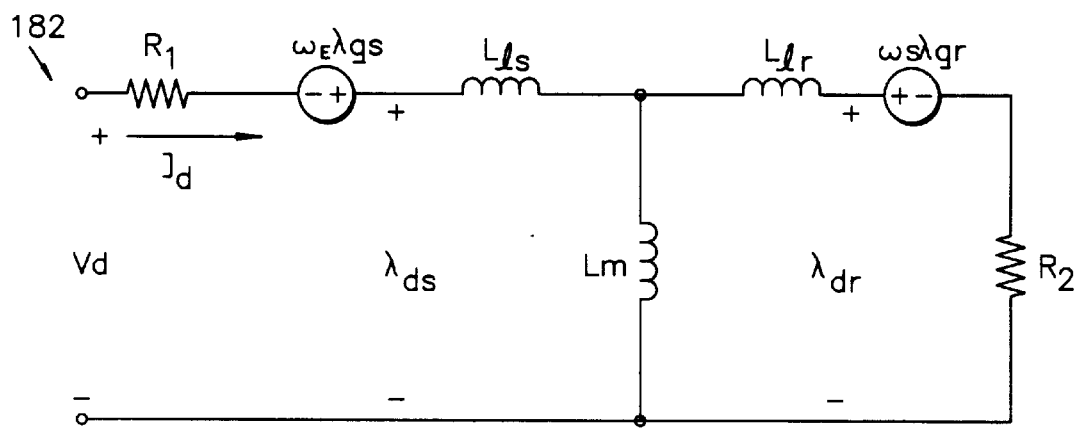
FIG. 15 is an induction motor coupled circuit diagram for d-axis variables for a field-oriented driven motor, in accordance with the present invention.

First Running Rotor Test:

Referring to FIGS. 14 and 15, coupled circuit diagrams 180,182, for q-axis and d-axis variables, respectively, for a field-oriented driven motor, have circuit parameters defined as follows:

Id=d-axis (or magnetizing) current; Iq=q-axis (or torque) current;
Vd=d-axis voltage; Vq=q-axis voltage;
$R_1$=stator resistance;
$L_{1s}$=stator leakage inductance; $L_{1r}$=rotor leakage inductance;
Lm=mutual inductance;
$\lambda_{ds}$=d-axis stator flux; $\lambda_{dr}$=d-axis rotor flux;
$\lambda_{qs}$=q-axis stator flux; $\lambda_{qr}$=q-axis rotor flux;
$\omega_S$=slip frequency; $\omega_E$=electrical frequency of the motor currents; and
$R_2$=rotor resistance.

For field orientation conditions to exist, as is known, the induction motor coupled circuit diagrams of FIGS. 14 and 15 require that $\lambda_{qr}=0$, $\lambda_{dr}=LmId$, $\lambda_{qs}=L\sigma Iq$ and $\lambda_{ds}=LsId$, where $Ls=Lm+L_{1s}$, and where $L\sigma$ is the transient inductance of the motor.

The variable frequency drive described herein operates with a constant magnetizing current. All current and voltage motor parameters designated herein by a subscript "r" or "R" are rotor parameters, and all other current and voltage motor parameters, unless described otherwise, are stator parameters.

Also, in a field oriented drive, as is known, the controller reference frame is oriented so that the d-axis is aligned with the rotor flux. Referring to FIG. 15, in steady state, where the transients have stabilized (i.e., dId/dt=0 and dIq/dt=0), the voltage across the inductors Lm, $L_{ls}$ is 0v. Thus, the equation for the d-axis stator voltage Vd for a field-oriented drive is defined as:

$$Vd=R_1Id-\omega_E L\sigma Iq \qquad \text{Eq. 8}$$

where the parameters of the Eq. 8 are defined above with FIG. 4.

It is also known that $\omega_E=\omega_R+\omega_S$ and $\omega_S=Iq/(Id\sigma_R)$, where $\omega_R$ is the rotational speed of the rotor. Substituting this for $\omega_E$ in Eq. 8 yields:

$$Vd=R_1Id-(\omega_R+Iq/(Id\tau_R))L\sigma Iq \qquad \text{Eq. 9}$$

Moving the right side of Eq. 9 to the left side, we define a new parameter, $V_{dERR}$, as:

$$V_{dERR}=Vd-R_1Id+(\omega_R+Iq/(Id\tau_R))L\sigma Iq \qquad \text{Eq. 10}$$

A zero value of the $V_{dERR}$ indicates that the drive is field oriented, i.e., that Eq. 8 is satisfied, when motor core losses can be neglected.

However, we have found that two factors may introduce errors into the calculation of $V_{dERR}$. The first factor is errors in the stator resistance estimate ($R_1$). In particular, we have found that the stator resistance $R_1$ is difficult to measure in the drive due to the low signal amplitudes involved and that off-line tests of stator resistance do not accurately predict the d-axis voltage during drive operation. While this error does not impact the current regulator closed loop operation of the indirect field oriented drive (which regulates the current to achieve desired performance independent of the value of R1), it does impact the accuracy of the calculation of $V_{dERR}$.

The second factor is core loss $L_C$ in the induction motor, which is not modeled in the standard induction motor model of FIGS. 14 and 15. The core loss $L_C$ at constant motor flux is approximately proportional to motor speed and is manifested as a component of voltage in the d-axis of the motor (Vd). Also, core loss must be supplied electrically by the stator voltage and current, even when there is no torque, i.e., when the q-axis current Iq is zero. Thus, the electrical power input to the motor to supply the core loss appears as a positive component of Vd.

Figure 19:
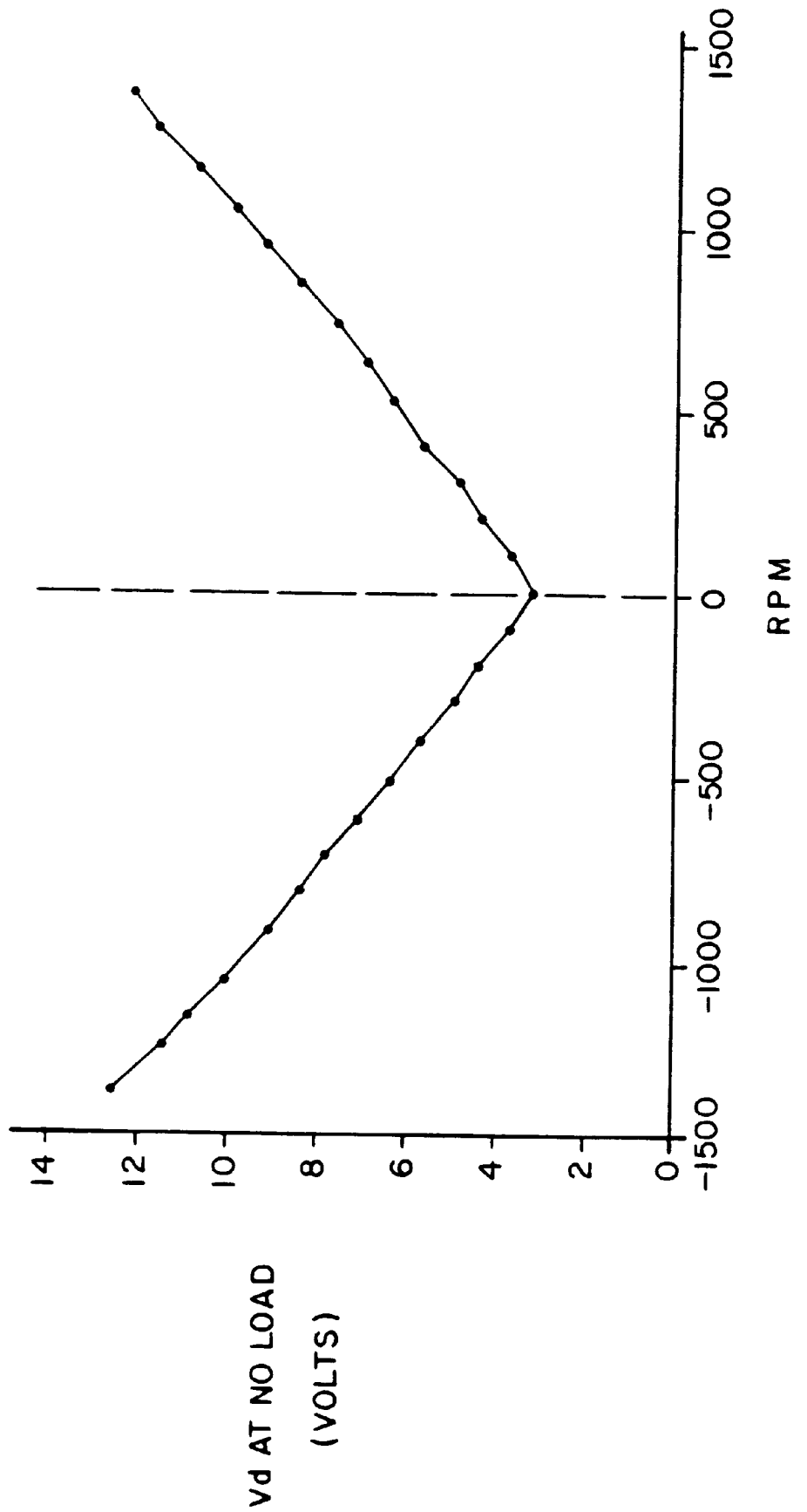
FIG. 19 is a graph of Vd vs. RPM at no load for a motor running in clockwise and counterclockwise directions, in accordance with the present invention.

More specifically, referring to FIG. 19, experiments on induction motors have shown, as is known, that the core loss component of Vd can be more than double the IR voltage drop component at rated speed. FIG. 19 shows core loss increases with speed by a plot of Vd vs. motor speed for a 32 kW 4-pole induction motor running at no load. In particular, at no load, Iq=0, and plugging Iq=0 into Eq. 8, gives Vd=$R_1$Id, where Id is a constant. Thus, Vd should be a constant over motor speed. However, from the graph of FIG. 19, it can be seen that:

$$Vd=R_1Id+L_C(\omega_E)$$

where core loss Lc is a function of motor speed $\omega_E$.

Thus, rather than computing the $V_{dERR}$ signal, the first running rotor test 262 may instead compute a loss component VDX equal to the stator I-R voltage drop ($R_1$Id) plus the core loss ($L_C$) which gives the following equation, derived from Eq. 10 and adding the core loss $L_C$:

$$VDX=Vd+\omega_E L\sigma Iq=R_1Id+L_C \qquad \text{Eq. 11}$$

where Id, Iq, and Vd are stator parameters. Also, $\omega_E=\omega_R+Iq/(Id\tau_R)$, as is known, which, when substituted into Eq. 4, gives:

$$VDX=Vd+(\omega_R+Iq/(Id\tau_R))L\sigma Iq \qquad \text{Eq. 12}$$

If the rotor time constant $\tau_R$ is correct, two measurements made at the same speed but at different loads (i.e., different values of Iq) should yield substantially equal values of VDX.

We have also found that the sign of VDX indicates whether the rotor time constant is low or high. In particular, VDX will be positive when the rotor time constant $\tau_R$ parameter is too low and negative when $\tau_R$ is too high, regardless of torque or direction and regardless of the IR drop and core loss.

The first running rotor test 262 makes an up run and a down run of the elevator with an empty car (using normal motion and speed profiles), thereby achieving two different load conditions. The value of VDX is computed and filtered to reduce noise (as a signal XDF) during the up run and the down run and the values of $\tau_R$ and $I_{dREF}$ (and thus Id) are adjusted until the values of XDF for the up and down runs are equal, or within a predetermined tolerance (discussed more hereinafter). The difference in the load conditions for up and down runs exists because the counterweight 34 (FIG. 1) has a weight equal to the empty car weight plus 40–50% of the rated load for the car as discussed hereinbefore.

Once a value for $\tau_R$ has been obtained from the above search, the value of magnetizing current reference $I_{dREF}$ (which results in a corresponding change to the magnetizing current Id) is adjusted to achieve the correct value of motor voltage under loaded conditions (i.e., during a down run with an empty car). A change in magnetizing current Id will change the flux level and therefore the saturation of the magnetizing characteristics of the motor and a change in the flux level will change the required torque current. As a result, the rotor time constant $\tau_R$ may change. Thus, the rotor time constant $\tau_R$ tuning described above is repeated using the new adjusted value of magnetizing current $I_{dREF}$, after which, the motor voltage is checked and the magnetizing current $I_{dREF}$ is adjusted again, if necessary, to adjust the motor voltage within a predetermined tolerance of the rated value.

Figure 13:
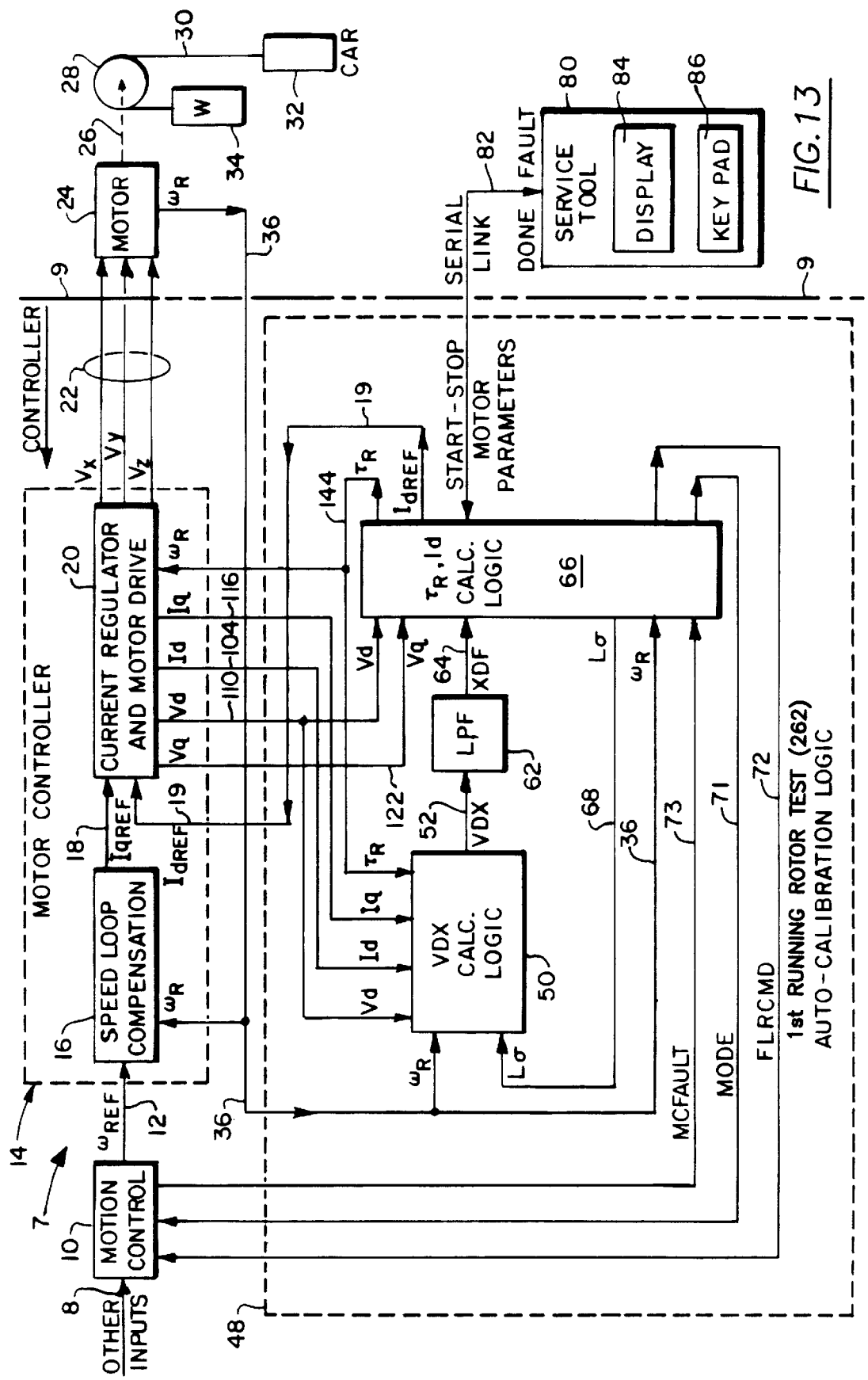
FIG. 13 is a block diagram of a portion of the auto-calibration logic of FIG. 1, in accordance with the present invention.

Referring to FIG. 13, more specifically, the first running rotor test portion 262 of the auto-calibration logic 48 comprises VDX calculation logic 50 which receives the necessary parameters to compute VDX using Eq. 11. VDX is calculated only when the speed parameter $\omega_R$ is greater than 50% of the full or rated or contract speed (RPM_Duty), which provides a windowing function to allow the calculation to occur when the voltage and current measurements are the most accurate (i.e., at or near rated speed). Such a windowing function is not required but provides more accurate calculations. Also, other windowing or signal scaling techniques may be used to avoid erroneous signals. For example, VDX may be multiplied by the motor speed $\omega_R$ or $\omega_E$ which would weigh the VDX signal more heavily at high speeds where the measurements are more accurate and the motor is at rated speed.

The value of VDX is provided on a line 52 to a low pass filter 62 having a break frequency at 10 Hz to reduce measurement noise. Other break frequencies for the filter 62 may be used if desired. The low pass filter 62 provides a filtered signal XDF on a line 64 to $\tau_R$, $I_{dREF}$ calculation logic 66. Other types of filters may be used if desired.

The logic 66 provides the constant $L\sigma$ to the VDX calculation logic 50 on a line 68. The logic 66 computes the rotor time constant $\tau_R$ which is provided on the line 144 to the current regulator/motor drive circuit 20 and to the VDX calculation logic 50. The logic 66 also computes $I_{dREF}$ which is provided on a line 76 to the current regulator/motor drive circuit 20.

The logic 66 also provides MODE and FLRCMD signals on lines 71,72, respectively, to the motion control logic 10. The MODE flag causes the motion logic 10 to accept floor commands from the FLRCMD signal on the line 72.

The FLRCMD signal commands the motion controller 10 to perform an elevator run in a commanded direction for a commanded number of floors (or to a particular destination floor) using a standard predetermined speed profile $\omega_{REF}$ (FIG. 18) in the motor control 10, discussed hereinafter. The motion control logic 10 also provides a motor controller fault signal MCFAULT on a line 73 to the logic 66 to indicate if a fault has occurred during an elevator run. During the elevator run, the elevator is run through a normal speed profile using an empty car with the normal safety features enabled.

Figure 18:
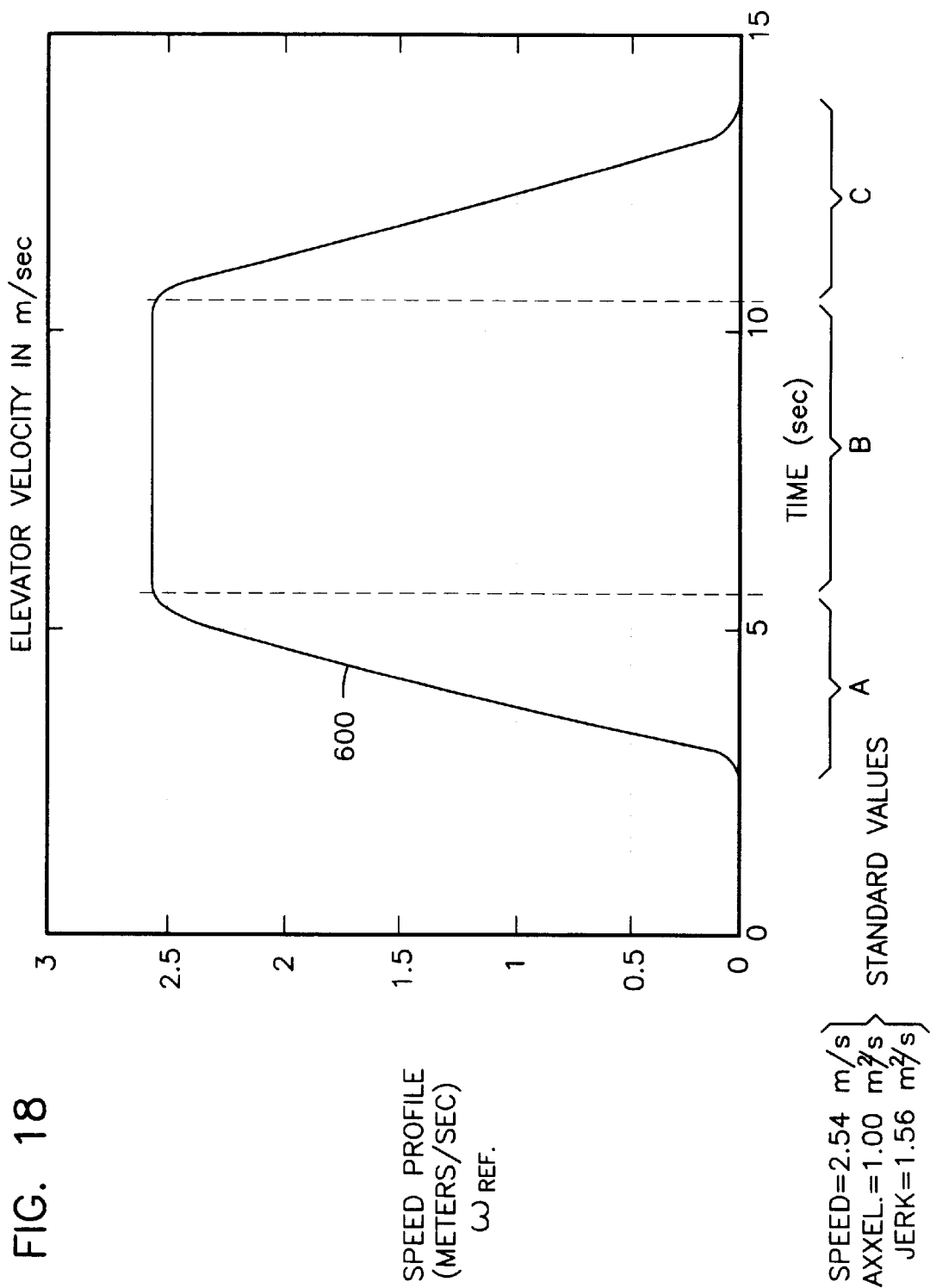
FIG. 18 is a graph of speed profile vs. time, in accordance with the present invention.

Referring to FIG. 18, a standard speed profile 600 for $\omega_{REF}$ provided by the motion control logic 10 has a ramp up region A, a constant speed region B (where the motor runs at the duty or contract speed for a given application), and a ramp down region C. The duration of the constant speed portion B is based on the number of floors (or destination floor) commanded by the FLRCMD signal. Whenever an up or down elevator run is commanded herein, the number of floors commanded are such that the constant speed portion B of the elevator run has a duration long enough to allow transients in the system to stabilize, e.g., at least about 3 seconds, which corresponds to about 3 or 4 floors, depending on the building floor height. The profile 600 is merely for illustration purposes and other ramp up/down rates, duty speeds, and overall profiles may be used, provided there is a constant speed portion having a duration long enough to allow system transients to stabilize. The number of floors or destination floor may be provided by the service tool 80 over the link 82.

The calculation logic 66 also communicates with a service tool 80 over a serial link 82. Also, the logic 66 receives motor parameters necessary to perform the first running rotor test 262, such as $L\sigma$, and initial values of $\tau_R$ ($T_{R\ INIT}$) and d-axis current loop reference $I_{dREF}$, as discussed more hereinafter. The logic 66 provides a DONE signal and a FAULT signal to the service tool 80 over the link 82. The DONE signal indicates when the first running rotor test 262 is complete and the FAULT signal indicates when a fault has been detected during the test 262.

Figure 16:
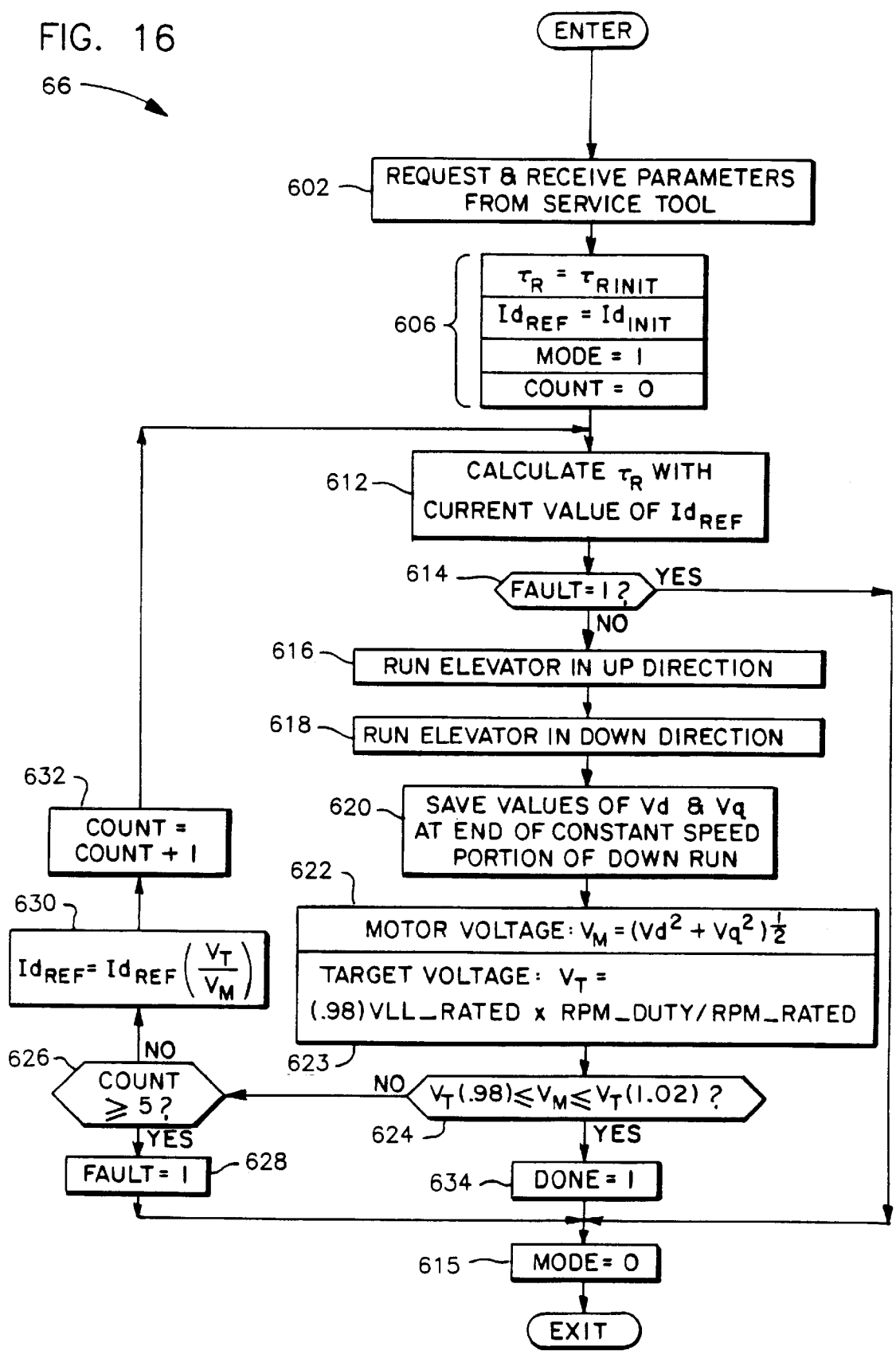
FIG. 16 is a logic flow diagram of a portion of the auto-calibration logic of FIG. 1, in accordance with the present invention.

Referring to FIG. 16, a top-level flow diagram for the $\tau_R$, $I_{dREF}$ calculation logic 66 begins at a step 602 which requests and receives the necessary parameters to perform the first running rotor test 262, such as $L\sigma$, $I_{dINIT}$, $\tau_{R-INIT}$ from the service tool 80. Some or all of the parameters $L\sigma$, $\sigma_{dR-INIT}$, $I_{dINIT}$ may be set based on the values of $R_1$, $L\sigma$, $\tau_R$, $I_{dRATED}$, respectively, previously calculated by the second locked rotor test 258, discussed hereinbefore.

Alternatively, some or all of the parameters $L\sigma$, $I_{R\ INIT}$, $I_{dINIT}$ may be approximated from motor data sheet parameters, as follows:

$L\sigma = Ls - (Lm^2/Lr)$ $\tau_{R-INIT} = Lr/Rr$ $I_{dINIT} = I_{NO-LOAD}$ where Ls is the stator winding inductance, Lr is the rotor winding inductance, Lm is the motor mutual inductance, Rr is the rotor winding resistance, and $I_{NO-LOAD}$ is the no load current and where Ls, Lm, Lr, Rr, and $I_{NO-LOAD}$ are all obtained from the motor data sheet. In that case, the service personnel may calculate the parameters $L\sigma$, $\tau_{R\ INIT}$, $I_{dINIT}$ and provide them to the logic 66 by the service tool 80. Alternatively, the service personnel may provide the parameters Ls, Lm, Lr, Rr, and $I_{NO-LOAD}$ to the logic 66 by the service tool 80, and the logic 66 calculates the parameters $L\sigma$, $\tau_{R\ INIT}$, $I_{dINIT}$ at the step 602. Other techniques may be used to obtain the initial parameters necessary to carry out the first running rotor test 262.

It should be understood by those skilled in the art of motors that $I_{NO-LOAD}$ is equal to the total motor current when the motor is under no load or torque, i.e., Iq=0. Thus, $I_{NO-LOAD}$ is equal to the rated d-axis (or magnetizing) current $I_{dRATED}$.

Next, a series of steps 606 sets $\tau_R$ to the initial value $\tau_{RINIT}$, sets $I_{dREF}$ to the initial value $I_{dINIT}$, sets MODE=1 and a variable COUNT=1. Then, a step 612 calculates a value for $\tau_R$ with Id at the current setting of $I_{dREF}$, discussed more hereinafter with FIG. 6. Next, a step 214 checks whether a fault has been detected in the step 212. If so, the logic 66 sets MODE=0 at a step 615 and exits.

If a fault has not been detected, the logic 66 performs a series of steps to check the motor voltage and, if needed, adjusts the magnetizing current Id. In particular, an optional step 616 runs the elevator in the up direction to get the elevator above the ground floor, if needed. Then, a step 618 runs the elevator in the down direction to take measurements. While the elevator is running in the down direction, a step 620 saves the values of Vd and Vq when the speed $\omega_R$ is at the end of (or during) the constant speed portion of the speed profile, to achieve steady state voltage measurement which cannot be obtained while the speed and/or torque are changing. Instead of running the elevator down to get Vm, the elevator may be run up, provided the motor is "pulling" a load, i.e., the motor is operating in a "motoring" operation as opposed to a regenerating or a braking operation, as this is the condition under which the drive is supplying power to the motor. To achieve this condition for an up run with the system shown in FIG. 1, the load in the car plus the car weight must be heavier than the counterweight.

Then, a step 622 calculates the measured total motor voltage using the vector sum equation: $V_M = (Vd^2 + Vq^2)^{1/2}$. The steady state voltage Vm during the constant speed portion of the run should approximately equal the rated line-to-line voltage (VLL_RATED) adjusted for differences between the nameplate rated speed in rpm (RPM_RATED) and the maximum (or contract or duty) speed in rpm of the speed profile for that building application (RPM_DUTY). Because the motor is operated with an empty car during the auto-calibration procedure, the motor voltage during an empty car down run will be slightly lower than the full car up run voltage. Therefore, the target voltage $V_T$ for empty car down operation is set to about 98% of the adjusted nameplate voltage. Thus, the target voltage $V_T$ is calculated at a step 623 by the equation:

$$V_T = (K \times VLL\_RATED \times RPM\_DUTY)/RPM\_RATED$$

where K is a predetermined percentage, e.g., 98%, VLL_RATED is the rated line-to-line voltage and RPM_RATED is the rated speed in rpm, both from the motor nameplate data, and RPM_DUTY is the duty or contract or maximum speed of the speed profile for that building application. The needed parameters may be provided by the service personnel from the service tool 80 over the link 82. Other percentages for the constant K may be used if desired.

Next, a step 624 tests whether the motor voltage $V_M$ is within 2% of the target voltage $V_T$. If not within 2%, a step 626 checks whether the loop has iterated at least five times. Typically, recalculation of $I_{dREF}$ is repeated approximately twice to get the magnetizing current to converge to the correct value. If it has iterated five times there is a problem with the system and a step 628 sets FAULT=1 which is sent to the service tool 80 (FIG. 1) over the serial link 82 and a step 615 sets MODE=0 and the logic exits. If it has iterated less than five times, a step 630 adjusts $I_{dREF}$ (and thus Id) by the equation: $I_{dREF} = I_{dREF} (V_T/V_M)$. Next, a step 632 increments the COUNT by 1 and the logic 66 proceeds to the step 612 to iterate again. If $V_M$ is within 2% of $V_T$ in the step 624, the algorithm is deemed to have converged and a step 634 sets DONE=1 which is sent to the service tool 80 via the link 82 and a step 615 sets MODE=0 and the logic 66 exits and returns to the main logic 48 (FIG. 3).

Figure 17:
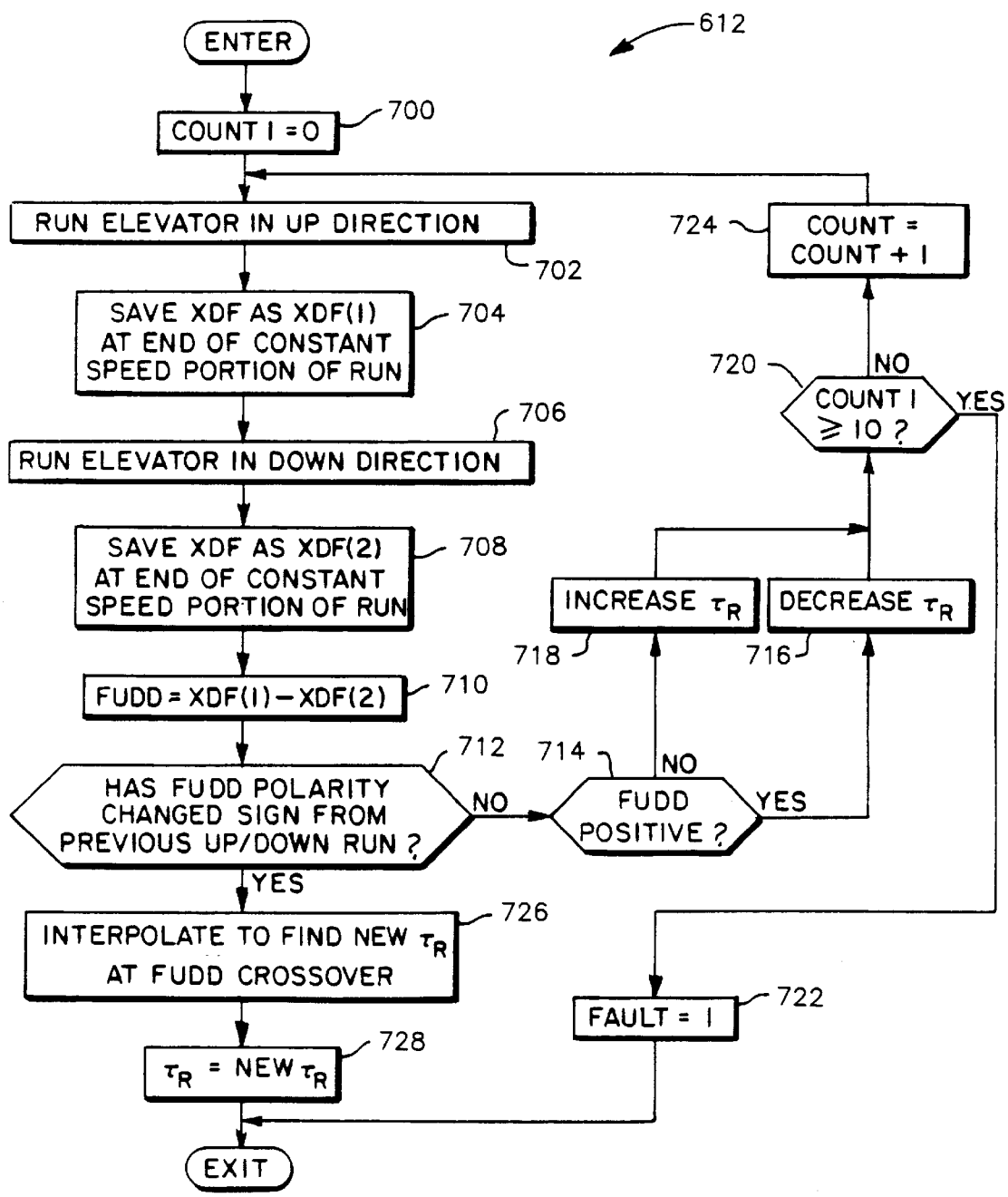
FIG. 17 is a logic flow diagram of a portion of the flow diagram of FIG. 16, in accordance with the present invention.

Referring to FIG. 17, the step 612 of FIG. 16, which calculates $\tau_R$ begins by setting a counter COUNT1=0 at a step 700. Next, a step 702 runs the elevator in the up direction using the standard speed profile (FIG. 18) discussed hereinbefore. During the up run of the elevator, a step 704 saves the values of XDF as XDF(1) when the speed $\omega_R$ is at the end of (or during) the constant speed portion of the speed profile.

Next, a step 706 runs the elevator in the down direction using the standard speed profile (FIG. 18) discussed hereinbefore. During the down run of the elevator, a step 708 saves the values of XDF as XDF(2) when $\omega_R$ is at the end of (or during) the constant speed portion of the speed profile of the run. Next, a step 710 calculates a filtered up/down difference (FUDD) equal to XDF(1)–XDF(2). The FUDD value for the run will indicate whether the $\tau_R$ is too high (FUDD>0) or too low (FUDD<0).

Next, a step 712 tests whether the sign (or polarity) of FUDD has changed from the FUDD for the previous up/down run of the elevator. If the sign of FUDD has not changed, a step 714 tests whether the sign of FUDD is positive. If FUDD is positive, $\tau_R$ is high and a step 716 decrements $\tau_R$ by a predetermined amount, e.g., 10%. If FUDD is not positive, $\tau_R$ is low and a step 718 increments $\tau_R$ by a predetermined amount, e.g. 10%. Other increment and/or decrement amounts may be used if desired.

Then, a step 720 tests whether the loop has iterated at least ten times (i.e., whether COUNT is greater than or equal to ten). If it has iterated at least ten times, a step 722 sets FAULT=1 which is transmitted via the serial link 82 to the service tool 80, and the logic 612 exits and returns to the logic 66 of FIG. 16. If it has iterated less than ten times, a step 724 increments COUNT1 by 1 and the logic 612 proceeds to perform another up/down run of the elevator starting at the step 702. If FUDD has changed sign in the step 712, then a step 726 linearly interpolates between the positive and negative FUED values and the corresponding $\tau_R$ values to find a New $\tau_R$ value where FUDD crosses through zero, and a step 728 sets $\tau_R$ to the New $\tau_R$ and the logic 612 returns to the logic 66.

Other search techniques may be used if desired to iterate to the correct value of $\tau_R$. An alternative search algorithm for $\tau_R$ is to use a binary type search where the search range is narrowed in successive runs until the change in $\tau_R$ or FUDD is within a predetermined tolerance.

Also, the logic 66,612 monitors for a stop command (not shown) received by the service tool 80 over the link 82. If a stop command is received the logic 66,612 aborts the remainder of the procedure, goes to the step 615 and exits.

The order of direction for the up-down elevator is run is not critical to the present invention, e.g., the elevator may be run down in the step 702 and up in the step 706 (FIG. 17). However, typically, service personnel will run the elevator to the ground or first floor to begin service or calibration. In that case, running the elevator up first may be necessary to provide a run which has a long enough duration, as discussed hereinbefore with the standard profile.

Figure 20:
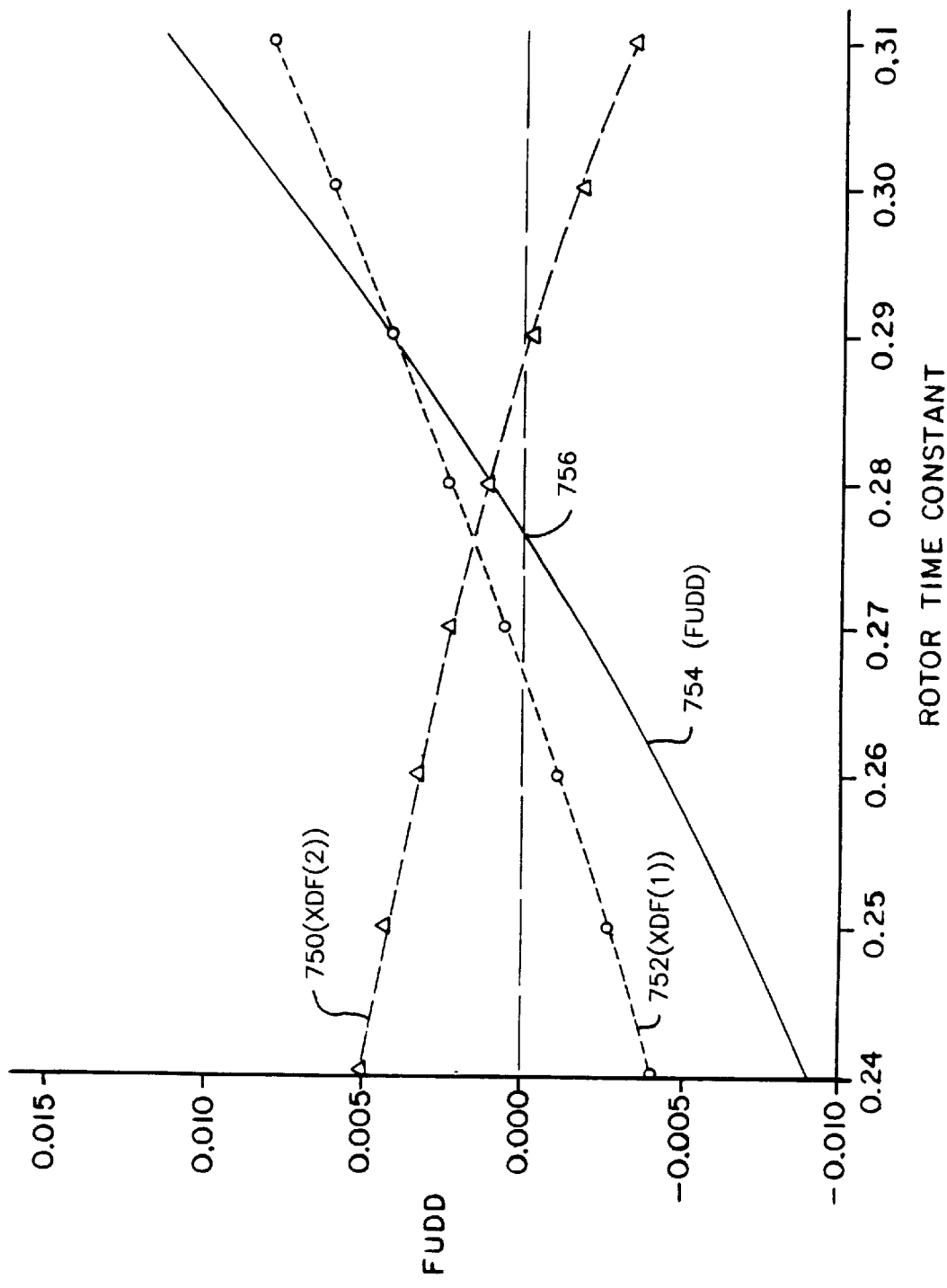
FIG. 20 is a graph of a loss component XDF and a filtered up/down difference FUDD vs. rotor time constant for an up run and a down run, in accordance with the present invention.

Referring to FIG. 20, the curve 752 of XDF(1) for the elevator up run and the curve 750 of XDF(2) for the down run is shown as well as a curve 754 showing corresponding values of the FUDD variable. XDF(1),(2) values and the FUDD value are plotted against the rotor time constant $\tau_R$ parameter for measurements made on a 2.0 meter per second geared hoistway. The curve 754 of FUDD is a smoothly varying, monotonically increasing curve with a well-defined zero-crossing at a point 756 which clearly indicates the correct value of the rotor time constant. The step 612 in the logic 66 calculates the value of $\tau_R$ corresponding to where FUDD crosses through zero shown as the point 756 on the FUDD curve 754.

While an empty car may be the easiest condition to obtain, the invention will also work at full load or partial load, provided a net load imbalance is achieved between the car and the counterweight. However, for a load condition (such as full load) which causes a net load imbalance such that the car plus its load is heavier than the counterweight, the slopes of the graph of FIG. 20 would change, and the search logic would change correspondingly.

Instead of using the filter 62 (FIG. 13), the signal VDX may be sampled directly by the logic 66 without a filter. In that case, the logic 612 would sample the value of VDX at the end of (or during) the constant speed portion of the run in steps 704,708 and VDX would replace XDF where ever it is referenced herein. Alternatively, instead or in addition to filtering VDX, the input signals to Eq. 12 for VDX may be filtered. Alternatively, the VDX calculation logic 50 may calculate VDX only when the motor speed is above a certain speed or has been at duty speed for a predetermined period of time.

Figure 21:
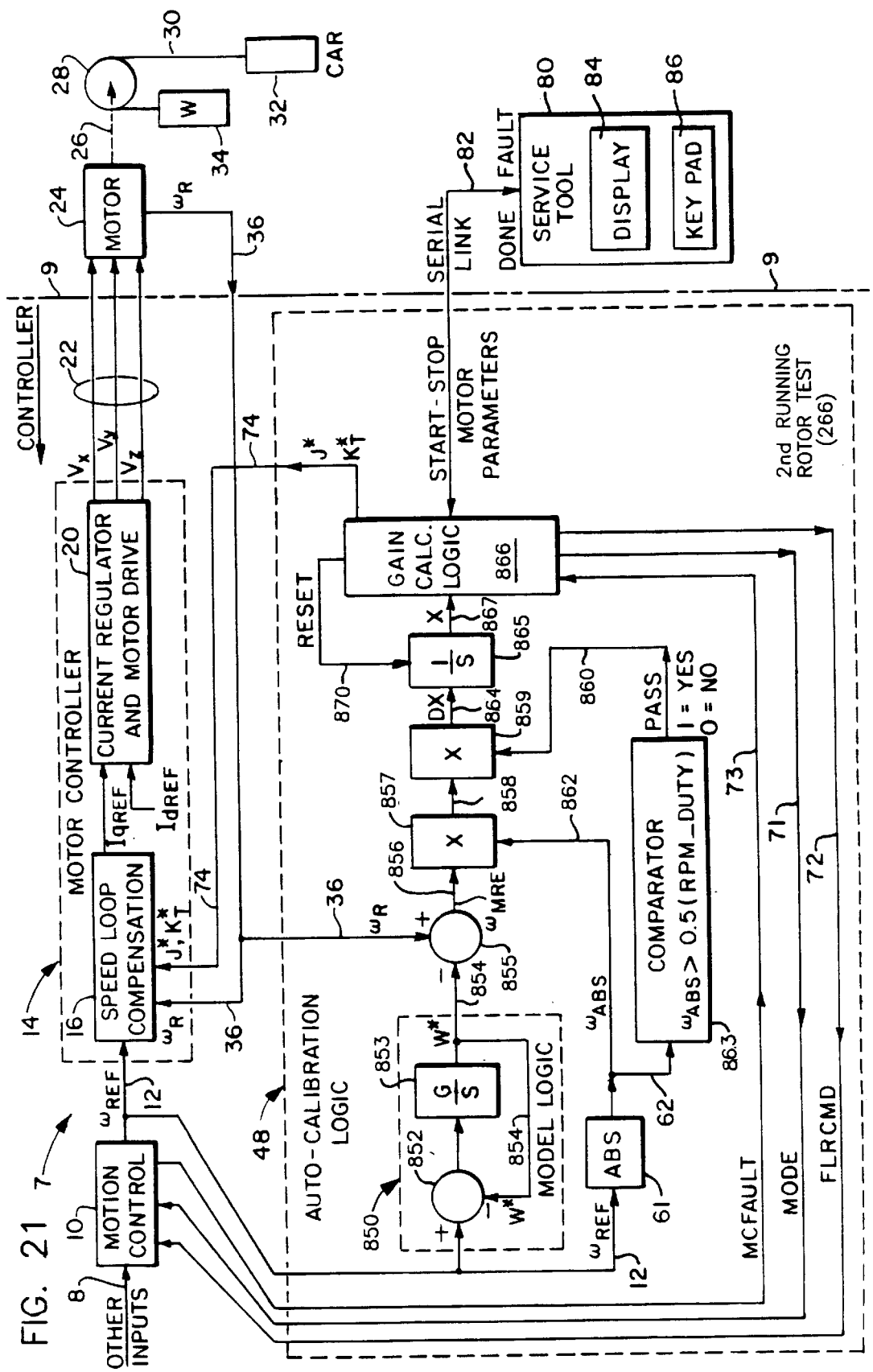
FIG. 21 is a block diagram of a portion of the auto-calibration logic of FIG. 1, in accordance with the present invention.

Second Running Rotor Test:

Referring to FIG. 21, the second running rotor test portion 266 of the auto-calibration logic 48 comprises model logic 850 which models the transfer function of the desired closed outer loop transfer function of the motor controller and plant (as discussed hereinafter with FIGS. 22–24). The logic 850 comprises a summer 852 which receives $\omega_{REF}$ on the line 12 at the positive input of the summer 852 and receives an estimated speed value W* on a line 854 at a negative input of the summer 852. The output of the summer 852 is fed to an integrator 853 (G/s) with a gain G.

The output of the logic 850 is the model (or estimated) speed signal W* provided on the line 854 to a negative input of a summer 855. The speed feedback signal $\omega_R$ (or $\omega_{FB}$) from the motor 24 on the line 36 is fed to the positive input of the summer 855. The output of the summer 855 is a model reference error signal $W_{MRE}$ on a line 856 indicative of the difference between the actual motor speed $\omega_R$ and the model motor speed W* from the model logic 850. The signal $W_{MRE}$ is fed to a multiplier 857. The speed reference signal $\omega_{REF}$ on the line 12 is fed to an Absolute Value Circuit (ABS) 861 which provides an absolute value signal $W_{ABS}$ on a line 862 indicative of the absolute value of $\omega_{REF}$ which is fed to the multiplier 857. The multiplier 857 multiplies $W_{MRE}$ by the absolute value of the speed reference signal $\omega_{REF}$ on the line 862.

The output of the multiplier 857 is provided on a line 858 to a multiplier 859, which multiplies the signal on the line 858 by a Pass signal on a line 860. The purpose of the multipliers 857,859 is discussed hereinafter. The polarity of the summer 855 inputs may be reversed.

The absolute value signal $W_{ABS}$ on the line 862 is also fed to a comparator 863 which provides the Pass signal. When the signal $W_{ABS}$ is greater than one half of the full (or contract or duty) running speed of the motor RPM_Duty, e.g., RPM_Duty=700 rpm, the output signal Pass on the line 860 is one. Conversely, if the speed signal $W_{ABS}$ is less than half of the full speed RPM_Duty, the output signal Pass from the comparator 863 is zero. The full speed RPM_Duty depends on the target application and may be 700 rpm, 1400 rpm, or other speeds as appropriate. The value for FPM_Duty may be provided by service personnel over the link 82 from the service tool 80.

The output of the multiplier 859 is a signal DX on a line 864. When Pass equals one, the signal DX is equal to the signal on the line 858 and when the Pass signal equals zero, DX equals zero. The signal DX on the line 864 is fed to an integrator 865 which provides an output signal X on a line 867 to gain calculation logic 866. The logic 866 contains known electronics and/or software capable of performing the functions described herein (discussed more hereinafter with FIG. 25).

Also, the gain calculation logic 866 provides an integrator reset signal on a line 870 to the integrator 865. The logic 866 also provides the MODE signal and the floor command signal FLRCMD on the lines 71,72, respectively, to the motion controller 10. The MODE signal causes the motion controller 10 to accept floor commands from the FLRCMD signal on the line 72.

The FLRCMD signal commands the motion controller 10 to perform an elevator run in a commanded direction for a commanded number of floors time (or to a particular floor) which corresponds to running the elevator for a predetermined time using a standard predetermined speed profile in the motor control 10, discussed more hereinafter. The motion control logic 10 also provides a motor controller fault signal MCFAULT on a line 73 to the logic 866 to indicate if a fault has occurred during an elevator run. The logic 866 also provides an estimated value of J* and $K_T$* on the lines 74 to the speed loop compensation logic 16 of the motor controller 14.

The calculation logic 866 also communicates with the service tool 80 over the serial link 82. Also, the logic 866 receives parameters necessary for the second running rotor test 266 to compute the values of J* and $K_T$* (discussed more hereinafter). The logic 866 provides a DONE signal and a FAULT signal to the service tool 80 over the link 82. The DONE signal indicates when the second running rotor test 266 has completed without any faults and the FAULT signal indicates when a fault has been detected during the test 266.

The logic 866 monitors the signal X on the line 867 and after each elevator run. If the value of X is not within a predetermined threshold, it calculates a new value for J* and commands another elevator up/down run. The logic 866 iterates the value of J* until the value is within predetermined tolerance and thereby obtains a tuned system, discussed more hereinafter.

Referring to FIG. 22, a control system block diagram equivalent diagram of a speed control loop comprising the motor controller 14, the motor 24 and the elevator system components connected to the motor 24 (FIGS. 1 and 21), are shown. Various portions of the control system of FIG. 22 may be analogized to the portions of the schematic block diagrams of FIGS. 1 and 21. In particular, the control system of FIG. 22 comprises the speed reference signal $\omega_{REF}$ on a line 910 (analogous to the line 12 of FIG. 1) from the motion control logic 10. The speed feedback signal $\omega_R$ on a line 914 is fed to the negative input of the summer 912. The summer 912 provides an error signal $W_E$ on a line 916 to outer loop forward path compensation 918 which comprises known proportional-plus-integral control logic having the following transfer function:

$$\frac{G(s/\omega_C + 1)}{s} \qquad \text{Eq. 13}$$

where G is the outer open loop gain, $\omega_C$ is the break frequency for the numerator lead and "s" is the known Laplace transform operator.

The output of the compensation logic 918 is a signal $W_1$ provided on a line 920 which is a reference to an inner speed control loop 922. The inner loop speed reference $W_1$ is fed to a positive input of a summer 924. The speed feedback signal $\omega_R$ on the line 914 is fed to the negative input of the summer 924. The output of the summer 924 is an inner loop error signal $W_{1E}$ on a line 926 which is fed to a multiplier 928 which multiplies $W_{1E}$ by constants $\omega_C \times J^*$, where J* is the estimated system inertia. The output of the multiplier 928 is a torque signal $T_1$ on a line 932 provided to a multiplier 934 which multiplies the signal $T_1$ by $1/K_T$*, where $K_T^*$ is the estimated motor torque constant. The output of the multiplier 934 is a current command $I_1$ on a line 936. The current command $I_1$ is provided to a block 938 indicative of the transfer function of the current regulator/motor drive 20 (FIG. 1) which has a transfer function of 1, in the frequency range of interest for the present invention.

The drive 938 provides a drive current I on a line 940 to a block 942 representing a current-to-torque multiplier (or torque constant $K_T$) of the motor 24 (FIG. 1). The torque constant $K_T$, as is known, is the ratio of motor torque to motor current. The motor 24 is a three-phase induction motor but may be any type of motor having a torque constant. For a field-oriented controlled induction motor, the current I represents the reference q-axis vector current $I_{qREF}$. The output of the multiplier 942 is the motor output torque $T_E$ on a line 944, which is provided to a positive input of a summer 946. The negative input to the summer 946 is a signal $T_{LOAD}$ on a line 948 indicative of additional external load disturbances on the elevator cab system, such as friction or a load imbalance between the car and counterweight. The output of the summer 946 is provided on a line 950 to a block 952 indicative of dynamics of the elevator inertia J, which is modeled as an integrator 1/Js with a gain 1/J. The output of the block 952 on the line 914 is the rotational speed $\omega_R$ (or $\omega_{FB}$) of the motor 24 (FIG. 1). The numerals 912–934 illustrates the control logic within the speed loop compensation logic 16 (FIG. 1).

Referring to FIG. 23, the block diagram of FIG. 22 can be simplified by expressing the inner loop 922 as a closed loop transfer function indicated by the below equation:

$$\frac{1}{(s/\omega_C K_1 + 1)} \quad \text{Eq. 14}$$

where $K_1 = (J^*/K_T^*) \times (K_T/J)$. Thus, the closed inner loop transfer function is a first order lag having a break frequency at $\omega_C K_1$.

Referring to FIG. 24, if the constant $K_1$ is equal to 1, the numerator (lead) of the outer open loop transfer function 918 matches and cancels with the denominator (lag) of the inner closed loop transfer function 922. The resultant transfer function 960 is an integrator (G/s) having a gain G. We have found that when $K_1 = 1$, the elevator/motor system exhibits a desirable response.

Figure 25:
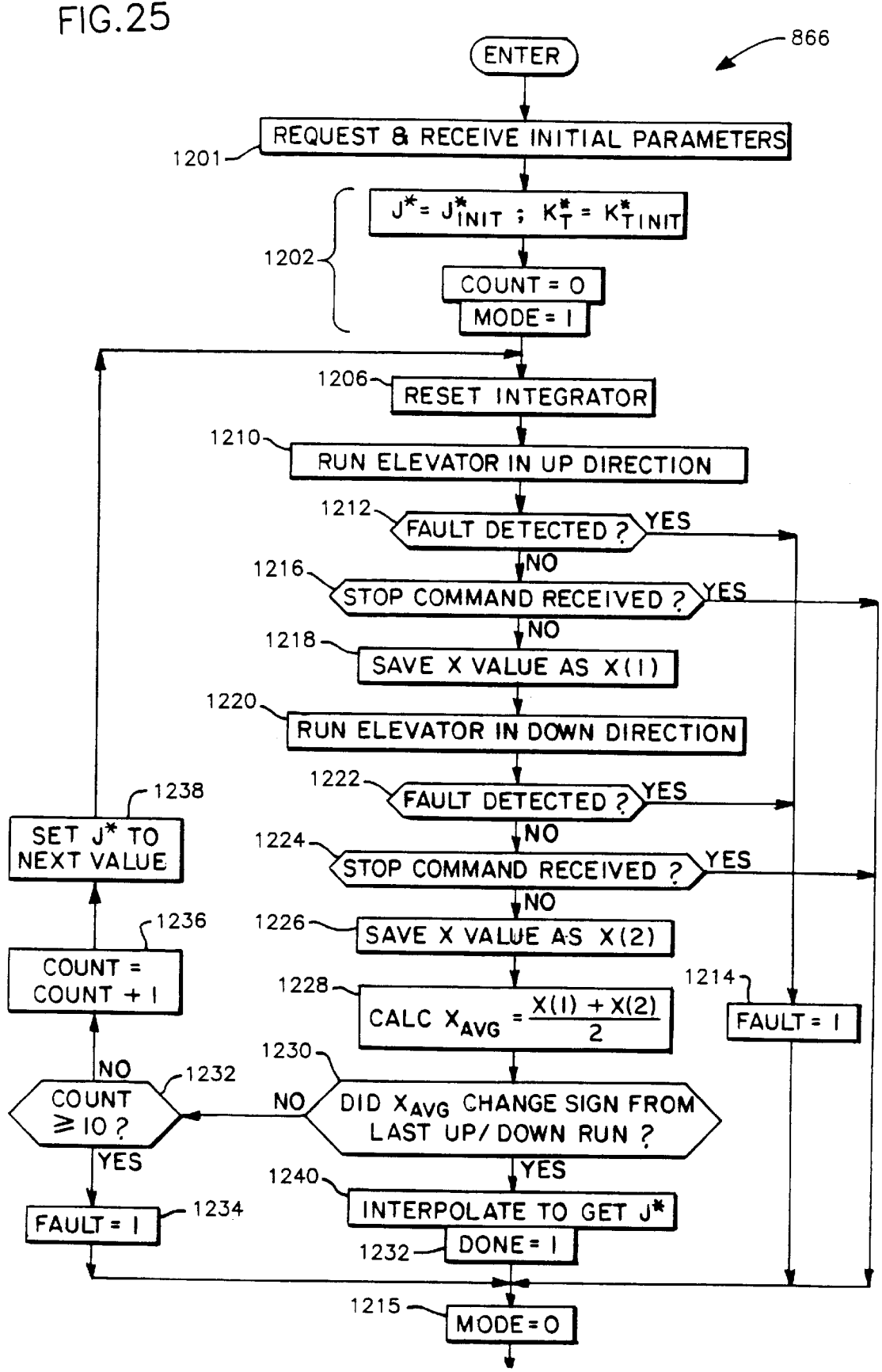
FIG. 25 is a logic flow diagram of a portion of the auto-calibration logic of FIG. 1, in accordance with the present invention.

Referring to FIG. 25, a flow diagram for the gain calculation logic 866 begins at a step 1202 which requests and receives the necessary parameters to perform the second running rotor test 266, such as $J^*_{INIT}$, $K_T^*_{INIT}$ from the service tool 80.

The parameter $K_T^*_{INIT}$ may be obtained from the previously run second locked rotor test 258. The values for the parameter $J^*_{INIT}$ may be approximated as shown below, and an alternative to receiving $K_T^*_{INIT}$ from a previous motor test is to approximate it as shown below:

$J^*_{INIT} = 2.0 + 6.0 \times \text{Load\_Duty} \times ((\text{RPM\_Duty} * 60)/\text{RPM\_Rated})^2$
$K_T^*_{INIT} = T_{RATED}/(I_{FULL-LOAD}^2 - I_{NO-LOAD}^2)^{1/2}$ where $T_{RATED}$ is the rated torque from the motor data sheet, $I_{FULL-LOAD}$ is the full load motor current from the motor data sheet, $I_{NO-LOAD}$ is the no load motor current from the motor data sheet, RPM\_Duty is the contract or duty or max speed the motor is run for the application, Load\_Duty is the duty or max load for the elevator for the application, RPM\_Rated is the rated motor speed from the motor nameplate. In that case, the service personnel may calculate the parameters $J^*_{INIT}$, $K_T^*_{INIT}$ and provide them to the logic 866 by the service tool 80. Alternatively, the service personnel may provide the parameters Load\_Duty, RPM\_Duty, RPM\_Rated, $I_{FULL-LOAD}$, $I_{NO-LOAD}$, $T_{RATED}$ to the logic 866 by the service tool 80, and the logic 866 calculates the parameters $J^*_{INIT}$, $K_T^*_{INIT}$ at the step 1201. Other values for the initial parameters $J^*_{INIT}$, $K_T^*_{INIT}$ may be used if desired; however, the values chosen for $J^*_{INIT}$, $K_T^*_{INIT}$ will determine how $J^*$ is adjusted (discussed more hereinafter). Other techniques may be used to obtain the initial parameters necessary to carry out the second running rotor test 266.

Next, a series of steps 1202 sets $J^*$ and $K_T^*$ to the initial values $J^*_{INIT}$, $K_T^*_{INIT}$, respectively, sets Count=0 to clear the loop counter, and sets MODE=1. Next, a step 1206 resets the integrator 865 (FIG. 21) output to zero.

Next, a step 1210 sets the FLRCMD signal to run the elevator in the UP direction, using the standard speed profile discussed hereinafter. The floor where the elevator is initially positioned will determine which direction the elevator will be run.

After the elevator up/down run is complete (as well as during the elevator run), a step 1212 determines whether a fault has occurred during the run of the elevator by reading the MCFAULT signal on the line 73 (FIG. 21). If a fault has been detected, a step 214 sets the FAULT signal equal to 1 which is sent over the link 82 to the service tool 80.

If a fault has not been detected during the run of the elevator, the logic 866 checks whether a stop command has been received from the service tool 80 in a step 1216. If a stop command has been received, the step 1215 sets MODE=0 the logic exits, and the second running rotor test 266 is aborted. If the stop command has not been received, the logic reads the signal X on the line 867 (FIG. 21) and saves it as a variable X (1) in a step 1218.

Next, a step 1220 runs the elevator in the DOWN direction (opposite to the run in the step 1210), using the standard speed profile discussed hereinafter. When the elevator up/down run is completed (as well as during the run), a step 1222 checks if a fault has occurred during the elevator run by monitoring the MCFAULT signal. If it has, the step 1214 sets the FAULT signal equal to 1 (FIG. 4), which is sent to the service tool 80 over the link 82, the step 1215 sets MODE=0, and the logic 866 exits. If a fault has not been detected, a step 1224 checks whether a Stop command has been received from the service tool 80. If a stop command has been received, the step 1215 sets MODE=0, the logic exits and the auto-calibration procedure is aborted. If not, a step 1226 saves the value of X as a variable X(2). The Up/Down run order may be reversed if desired.

Next, a step 1228 calculates the average X value of the up/down run as: $X_{AVG} = [X(1) + X(2)]/2$. Then, $X_{AVG}$ is checked at a step 1230 to see if it has changed sign (or polarity) from the last up/down run. If it has not changed sign, a step 1232 checks whether Count is greater than or equal to 10 iterations. If the loop has iterated less than ten times, a step 1234 sets the Fault flag to one and sends it to the service tool 80 over the link 82 (FIG. 21). If not, a step 1236 increments Count by one and a step 1238 calculates the next value of $J^*$. For example, if $J^*_{INIT}$ is set high as discussed hereinbefore, $J^*$ is reduced by a predetermined amount, e.g., 20% or $J^*(n+1) = J^*(n) \times 0.8$, at the step 1238 and the logic 866 goes back to the step 1206 to perform another up/down run of the elevator. Other percentage changes for $J^*$ may be used. Conversely, if $J^*_{INIT}$ is set low, $J^*$ is increased by a predetermined amount in the step 1238.

If $X_{AVG}$ has changed sign, the result of the test 1230 will be yes and a step 1240 interpolates to determine the value of $J^*$ where $X_{AVG}$ crosses zero. In particular, referring to FIG.

28, a curve 1360 shows the values of X plotted for given estimated set of values of J*. When the value of X crosses through zero, the values of J* associated with the data points 1362, 1364 on both sides of zero are interpolated to determine the point 1366 at which the curve 1360 crosses through zero. The result of this interpolation is the approximated value for the system inertia J* which will be used b y the motor controller 8 (FIG. 21).

Other gain adjustment algorithms for the logic 866 may be used if desired, provided the algorithm converges to the correct value of J* within the desired tolerances. Also, the logic described herein may be performed using values of X from only an up or down run (i.e., without averaging); however, averaging X from up and down runs provides the most robust values for J*.

Figure 26:
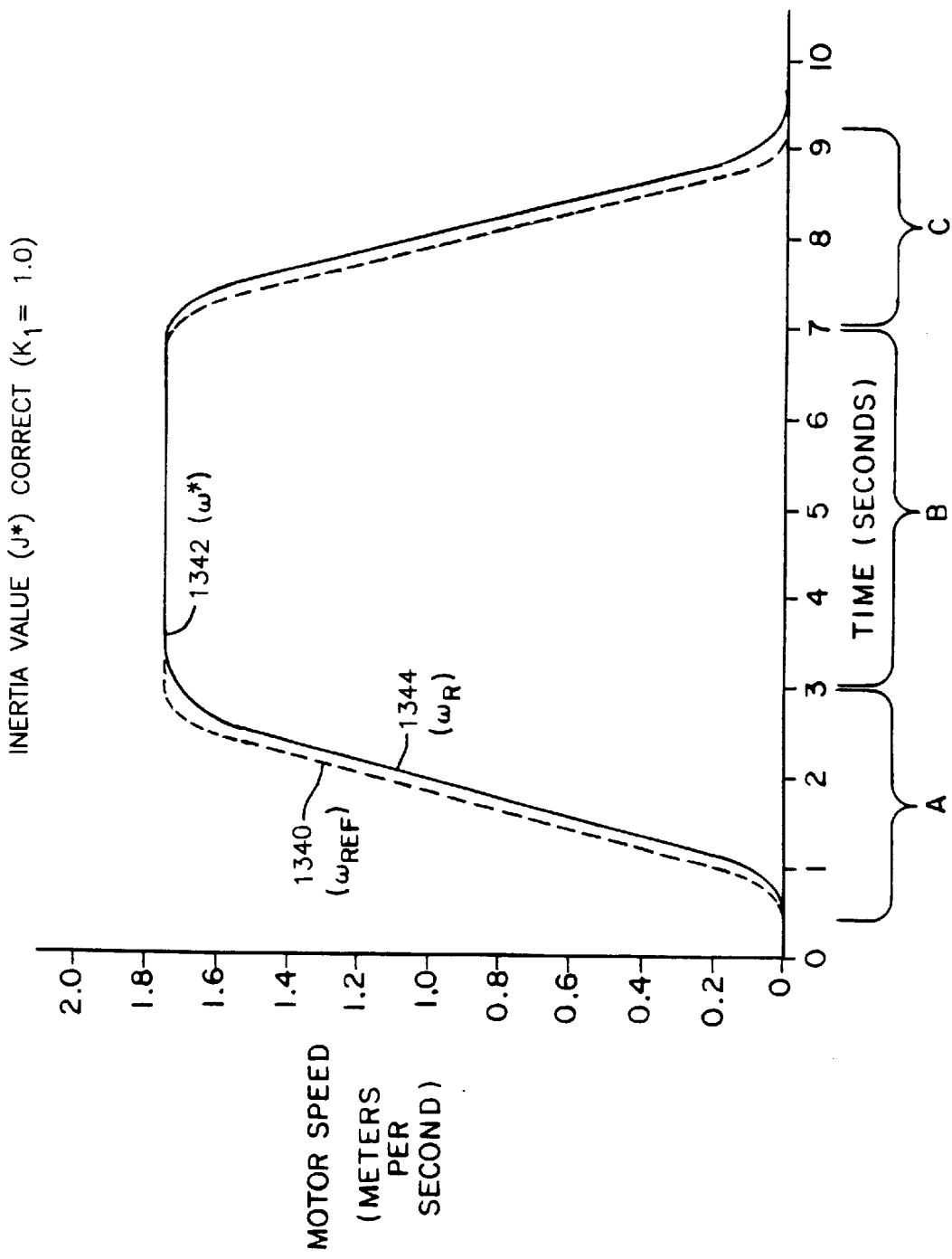
FIG. 26 is a graph of three motor speed parameters versus time when the inner loop gain estimate is correct, in accordance with the present invention.

Referring to FIG. 26, the reference signal $\omega_{REF}$, the output of the ideal model 850 (FIG. 21) W*, and the actual speed of the motor $\omega_R$ (or $\omega_{FB}$) are indicated by the curves 1340, 1342, 1344, respectively. The speed profile reference curve 1340 ($\omega_{REF}$) is indicative of a typical speed profile for the elevator comprising a ramp-up (or increasing or acceleration) speed region A, a constant speed region B (where the motor runs at the duty or contract or full speed for a given application) and a ramp down (or decreasing or deceleration) speed region C back to zero, as discussed hereinbefore.

The duration of the constant speed portion B is based on the number of floors (or destination floor) commanded by the FLRCMD signal (FIG. 21). The duration of the constant speed portion B is not critical to the second running rotor test 266 to determine J*. However, the acceleration and deceleration regions A,C of the speed profile provide information to determine the correct value of J*. Also, the higher the speed, the better the measurements for J*; thus, the elevator is run up to duty speed.

The profile 1340 is merely for illustration purposes and other ramp up/down rates, duty speeds, and overall profiles may be used. The number of floors or destination floor may be provided by the service tool 80 over the link 82.

If the parameters of the model of FIGS. 22–24 are set as follows: J*=4.0 (high); 1.0 (low); 2.28 (correct). $K_T$*=2.44, $K_T$=2.44, J=2.28, G=8, $\omega_c$=4, this gives values for K1, as K1=J*/2.28, which when evaluated at J*=1, 4.0, 2.28, yields K1=0.44, 1.75, 1, respectively.

Figure 27:
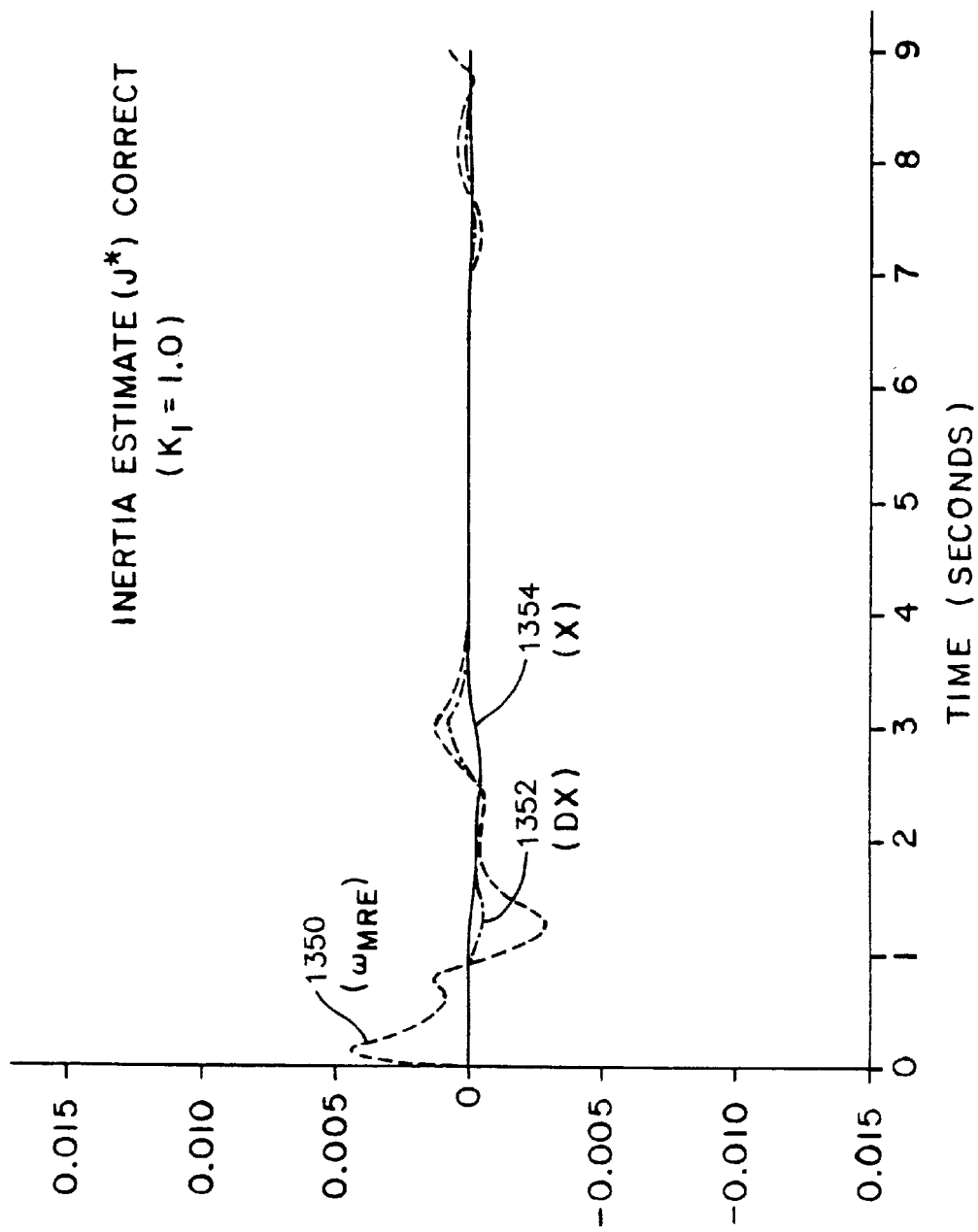
FIG. 27 is a graph of three parameters in the auto-calibration logic of FIG. 1 versus time when the inner loop gain estimate is correct, in accordance with the present invention.
Figure 28:
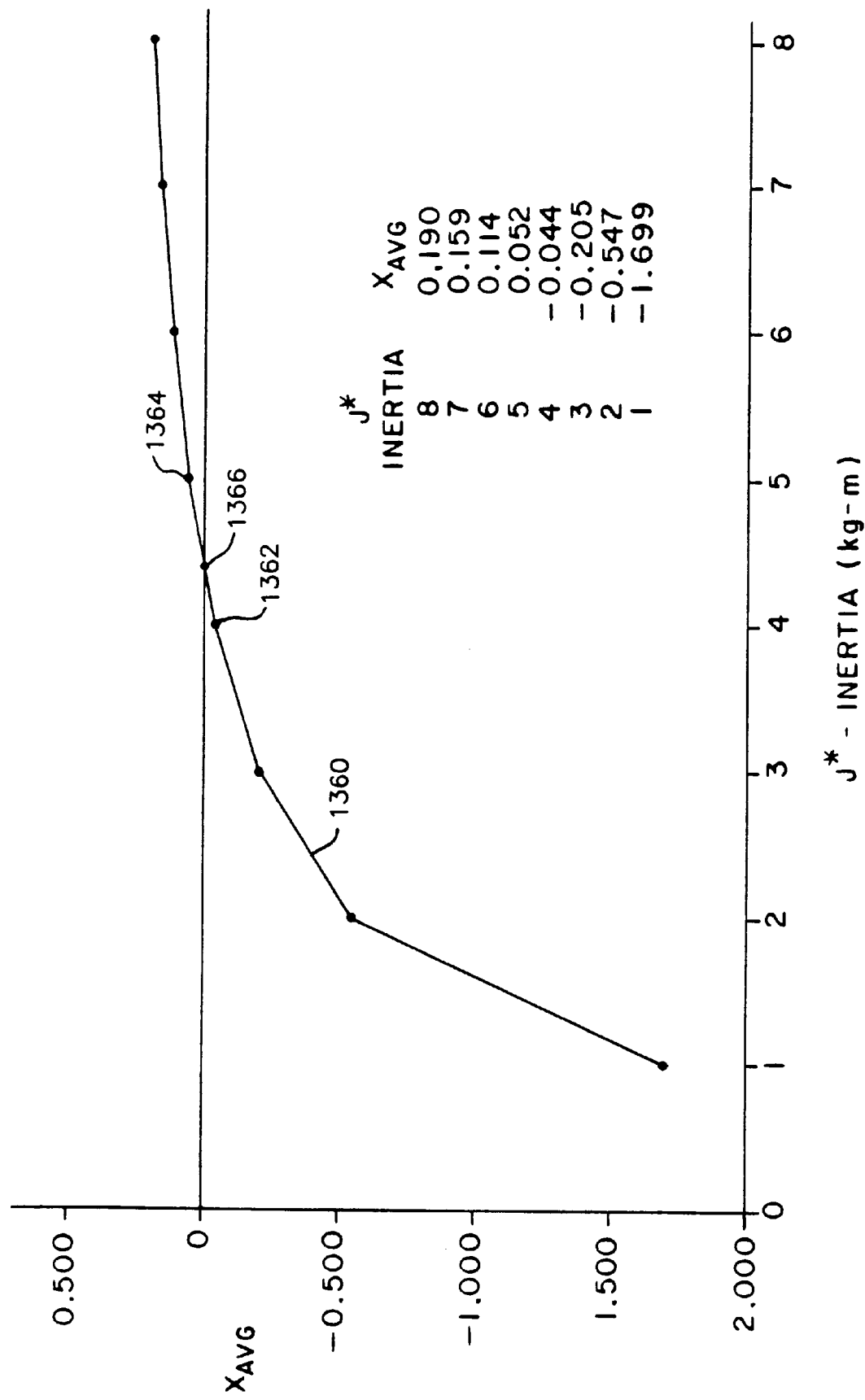
FIG. 28 is a graph of $X_{AVG}$ versus estimated inertia (J*) for various values of J*, in accordance with the present invention.

Referring now to FIGS. 26 and 27, if the inertia value J* is the correct value (i.e., K1=1.0, J*=2.26), the parameter $\omega_{REF}$ is indicated by a curve 1340, the parameter W* is indicated by a curve 1342, and the parameter $\omega_R$ is indicated by a curve 1344. As expected, the feedback signal $\omega_R$ is substantially equal to the desired signal W* with minimal overshoot or undershoot. Referring to FIG. 27, parameter $W_{MRE}$ is indicated by a curve 1350, the parameter DX is indicated by a curve 1352 and the parameter X is indicated by a curve 1354. As expected, the parameter X is close to zero at the end of an elevator run indicating that the error between the desired speed output and the actual speed output is small and is within the desired tolerance.

However, if the inertia J* value is high, e.g., J*=4.0 and thus, K1=1.75, the actual motor speed response will exhibit a sluggish response. In this case, the value of X is negative at the end of the run. Conversely, when the inertia value J* is a low value, e.g., J*=1.0 and, thus, K1 equals 0.44, the actual motor speed response will have an overshoot. In that case, with the inertial estimate low, the resultant value of X at the end of a single elevator run is positive.

Referring to FIG. 21, the multiplier 857 provides speed scaling or windowing of the error signal $W_{MRE}$ to the integrator 865, such that at low speeds, i.e., during ramp up and ramp down regions of the speed profile, the signal error $W_{MRE}$ is scaled down. Such scaling is done because the model logic 850 does not account for the load torque on the elevator system which comprises friction and hoistway imbalance and will in general be difficult to quantify. The friction will be non-linear, particularly for geared elevator systems and gearbox friction will be higher at low speeds, and gradually reducing to the lowest values as the speed reaches fill speed.

Also, the multiplier 859 provides a windowing dead-band function which forces the integrator 865 to ignore model reference errors at low speeds by forcing DX to zero until the speed exceeds a predetermined percentage of the full speed. The comparator 863 uses a value of 50% of the full speed of the system as the width of the dead-band; however, other values may be used.

While the multipliers 857,859 are not required for the present invention, they provide optimal performance. Also, instead of using both the multipliers 857,859 to scale and window the input signal DX to the integrator 865, either one may be used individually if desired to provide a similar effect. Also, other windowing or signal scaling techniques may be used to avoid erroneous signals.

The term "loop gain" as used herein refers to the parameter (or factor) J* of the gain of the inner speed loop 922 (FIG. 22) within the speed loop compensation 16, which is varied as described herein, as well as the overall loop gain (e.g., $\omega_C J^*/K_T^*$). The other factors $\omega_C$, $K_T^*$ of the speed loop are constants, and as such, variation of J* results in variation of the speed loop gain. Also, it should be understood that instead of providing a variable J* and a constant $K_T^*$, the logic 866 may provide a single variable parameter equal to a combination of loop gain factors (e.g., $J^*/K_T^*$) or equal to the overall loop gain (e.g., $\omega_C J^*/K_T^*$) to the logic 16. In either case, the value of the loop gain is varied as described herein until the desired. response is achieved.

Instead of the integrator 865, a low pass filter or any other type of filter may be used to filter transients in DX and provide an average value of DX over a given run. In that case, the output of the filter 865 may be sampled by the logic 866 prior to Pass or $\omega_R$ going to zero, e.g., during the constant or duty speed portion of the run. Also, the multipliers 857,859 may be modified to operate with the filter chosen, to provide the desired output signals.

Alternatively, instead of using the integrator (or filter) 865, the signal DX may be sampled directly by the logic 866 without a filter or integrator. In that case, the logic 866 would sample the value of DX at the end of (or during) the constant speed portion of the run in steps 1218, 1226 (FIG. 25) and DX would replace X where ever it is referenced herein. Alternatively, instead or in addition to filtering DX, the input signals to the calculation of DX may be filtered. Alternatively, the logic 266 may calculate DX only when the motor speed is above a certain speed or has been at duty speed for a predetermined period of time.

The order of direction for the up-down elevator is run is not critical to the present invention, e.g., the elevator may be run down in the step 1210 and up in the step 1220 (FIG. 25). However, typically, service personnel will run the elevator to the ground or first floor to begin service or calibration. In that case, running the elevator up first may be necessary to provide a run which has a long enough duration, as discussed hereinbefore with the standard profile.

As each of the four tests 252,258,262,266 completes, parameters are automatically stored in the memory of the motor controller 14 eliminating the need for the installer or service personnel to enter such parameters manually. As each test in the self-commissioning process is completed, the logic 48 (or the specific test logic) provides a DONE flag to the service tool 80 and provides particular motor parameters of interest for the service personnel. Alternatively, the logic 48 may provide an indication to the service tool when all tests are completed.

Instead of the four testes 252,258,262,266 running automatically, after each test completes, the logic 48 may wait for the service tool 80 to provide another start command to perform the next test in the sequence. Alternatively, the service tool 80 may command which test is to be performed.

Although the invention has been described and illustrated with respect to exemplary embodiments thereof, it should be understood by those skilled in the art that the foregoing, and various other changes, omissions and additions may be made without departing from the spirit and scope of the present invention.

What is claimed is:

1. A method of self-commissioning a field-oriented elevator motor controller while a corresponding elevator motor is connected through roping to an elevator which is to be driven by said motor, comprising the steps of:

a) with said motor connected to said elevator by roping, locking the rotor of said motor so that it cannot turn, applying a drive current to said motor and determining values of Id, Iq, Vd, and Vq resulting from application of said drive current, and calculating from said values an integral gain $K_I$ and a proportional gain $K_p$ for the motor controller;

b) with said motor still roped to said elevator and said rotor locked so it cannot turn and with the values of $K_I$ and $K_p$ calculated in step a) operative as parameters within said motor controller, applying a drive current to said motor and determining additional values of Id, Iq, Vd and Vq, and calculating from said additional values, initial values of a rotor time constant $\tau_R$, magnetizing current Id, and motor torque constant $K_T^*$ for the motor controller, and a value of a motor transient inductance Lσ;

c) unlocking said rotor, and with the values of $K_I$ and $K_p$ provided in step a) and values of $\tau_R$, Id, $K_T^*$ and Lσ provided in step b) operative as parameters within said motor controller, moving said elevator and calculating final values for said rotor time constant $\tau_R$ and magnetizing current Id; and d) with the values of $K_I$ and $K_p$ provided in step a), the values of $K_T^*$ and Lσ provided in step b), and the values of $\tau_R$ and Id provided in step c) operative as parameters within said controller, moving said elevator and calculating a system inertia J* for the motor controller.

2. The method of claim 1 wherein said steps (a)–(d) are performed upon receiving a command from a service tool.

3. A method of self-commissioning a field-oriented elevator motor controller while a corresponding elevator motor is connected through roping to an elevator which is to be driven by said motor, comprising the steps of:

a) with said motor connected to said elevator by roping, locking the rotor of said motor so that it cannot turn, applying a drive current to said motor and determining values of Id, Iq, Vd and Vq resulting from application of said drive current, and calculating from said values an integral gain $K_I$ and a proportional gain $K_p$ for the motor controller;

b) from values of Ls, Lm, Lr and Rr provided on a motor data sheet for said motor, calculating values of a motor transient inductance Lσ=Ls−(Lm²/Lr), and initial values of a rotor time constant $\tau_R$=Lr/Rr and magnetizing current Id=$I_{No\text{-}LOAD}$;

c) unlocking said rotor, and with the values of $K_I$, $K_p$ provided in step a), values of $\tau_R$, $I_d$ and Lτ provided in step b) and a value of $K_T^*$ provided on said motor data sheet operative as parameters within said motor controller, moving said elevator and calculating final values for said rotor time constant $\tau_R$ and magnetizing current Id; and d) with the values of $K_1$ and $K_p$ provided in step a) the value Lσ provided in step b), the values of $\tau_R$ and $I_d$ provided in step c) and the value of $K_T^*$ provided on said motor data sheet operative as parameters within said motor controller, moving said elevator and calculating a system inertia J* for the motor controller.

* * * * *